United States Patent
Horita et al.

[11] Patent Number: 5,811,756
[45] Date of Patent: Sep. 22, 1998

[54] ARC WELDING METHOD FOR ALUMINUM MEMBERS AND WELDED PRODUCT EXCELLENT IN DIMENSIONAL ACCURACY AND EXTERNAL APPEARANCE

[75] Inventors: Motoshi Horita; Harumichi Hino, both of Shizuoka-Ken; Masayuki Kobayashi, Tokyo, all of Japan

[73] Assignee: Nippon Light Metal Company, Inc., Tokyo, Japan

[21] Appl. No.: 589,193

[22] Filed: Jan. 22, 1996

[30] Foreign Application Priority Data

| Jan. 23, 1995 | [JP] | Japan | 7-027361 |
| Mar. 27, 1995 | [JP] | Japan | 7-093066 |
| Oct. 9, 1995 | [JP] | Japan | 7-288067 |

[51] Int. Cl.$^6$ .................................................... B23K 9/23
[52] U.S. Cl. ............................................ 219/137; 219/160
[58] Field of Search ............................ 219/137 WM, 219/123, 125.1, 125.11, 137 R, 160, 136; 228/212, 44.3

[56] References Cited

U.S. PATENT DOCUMENTS

| 2,145,937 | 2/1939 | Lockwood | 219/137 R |
| 3,551,637 | 12/1970 | Lampson | 219/123 |
| 4,542,280 | 9/1985 | Simons | 219/137 WM |
| 4,570,049 | 2/1986 | Albert et al. | 219/124.1 |
| 5,524,813 | 6/1996 | Pease | 228/212 |
| 5,580,474 | 12/1996 | Smith | 219/137 R |
| 5,641,417 | 6/1997 | Glagola et la. | 219/137 WM |
| 5,672,286 | 9/1997 | Seeds | 219/137 WM |

FOREIGN PATENT DOCUMENTS

| 63-264282 | 11/1988 | Japan . |
| 399780 | 4/1991 | Japan . |

OTHER PUBLICATIONS

Taylor Lyman, editor, "Metals Handbook, 8th edition, vol. 6, Welding and Brazing", 1971, pp. 303–305.

Susumu Numajiri et al., of Mitsubishi Motors Corporation, "*Development of Al Casing Viscous Torsional Damper*", Seminar of the Society of Automotive Engineers, Report No. 943, pp. 45–48.

"Recommended practice for inert gas shielded arc welding of aluminum and aluminum alloy" JIS—Z3604, 1993, pp. 829–840.

*Primary Examiner*—Clifford C. Shaw
*Attorney, Agent, or Firm*—Webb Ziesenheim Bruening Logsdon Orkin & Hanson, P.C.

[57] ABSTRACT

When aluminum members are arc welded at a welding speed of 2–7 minute, a quantity of input energy is remarkably reduced so as to form a welded joint free from deformation or strains. A weld bead with sufficient penetration is formed due to the high thermal conductivity of the aluminum material. The penetration is promoted by jagging the groove face. The heat balance between the aluminum members different in heat capacity from each other is stabilized by holding a jig having big heat capacity in contact with the aluminum member having smaller heat capacity, so that a good weld joint can be obtained regardless of the difference in heat capacity.

16 Claims, 26 Drawing Sheets

(PRIOR ART)

$Wj > Wa - Wb$

Wa : broadening of arc
Wb : width of aluminum member to be welded
Wj : width of jig $Wj > Wa - Wb$ Wa : broadening of arc
Wb : width of aluminum member to be welded
Wj : width of jig $t_3 < t_2$

UNSTABLE HEAT BALANCE

STABILIZED HEAT BALANCE

EFFECTS OF JIGS ON LENGTH OF SAGGING AND WIDTH OF UNMELTED PART knurling tool
(crossed pattern)

(unit : mm)

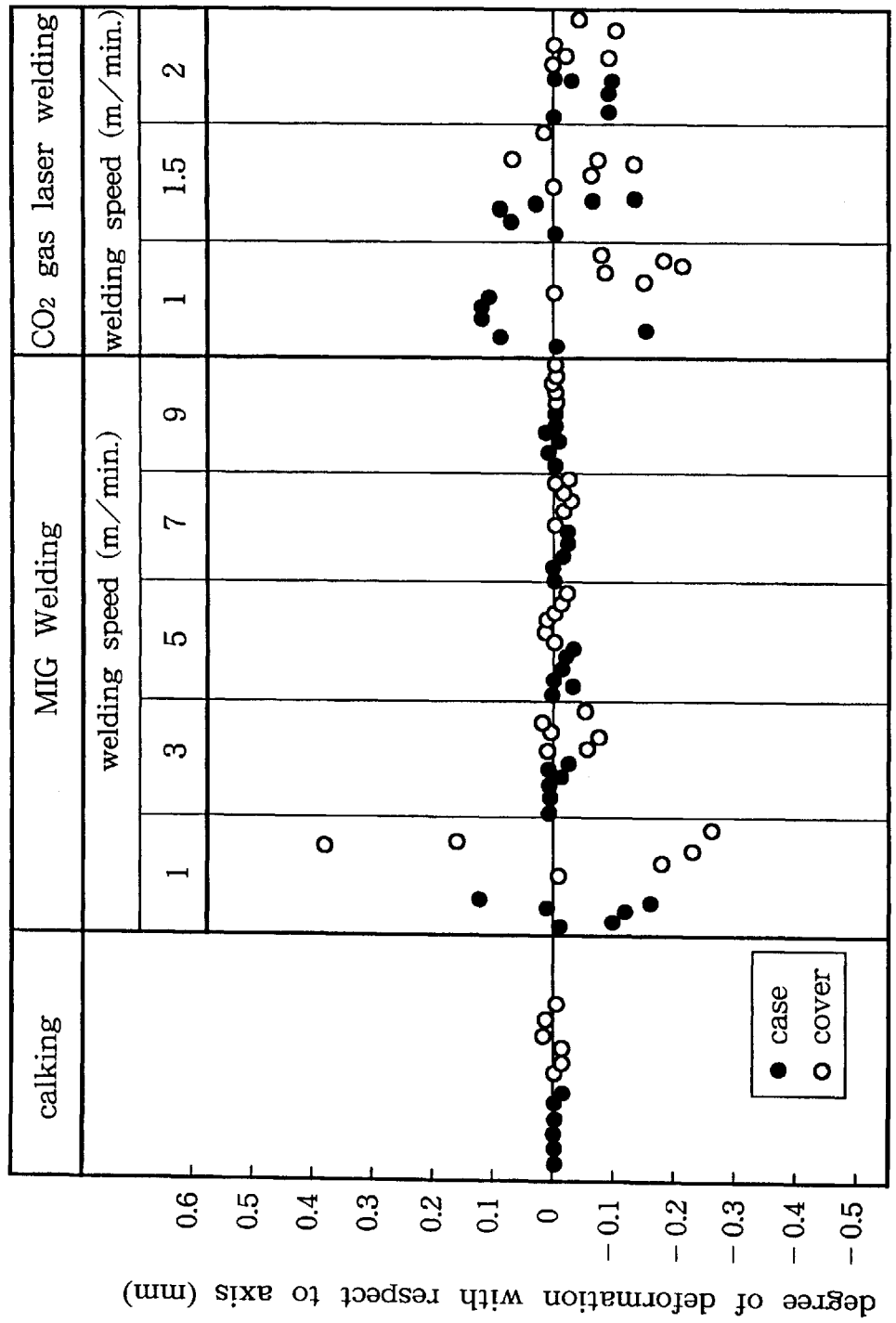

ARC WELDING METHOD FOR ALUMINUM MEMBERS AND WELDED PRODUCT EXCELLENT IN DIMENSIONAL ACCURACY AND EXTERNAL APPEARANCE

BACKGROUND OF THE INVENTION

The present invention relates to an arc welding method for manufacturing a welded product improved in dimensional accuracy and external appearance without substantial thermal deformation and also relates to a welding method for arc welding aluminum members while suppressing the effect of the difference in heat capacity between welded members so as to inhibit weld defects such as saggings and burning through. The present invention is concerned with a welded product such as a viscous-type damper, too.

A viscous-type damper has an annular receptacle 2 formed at the periphery of the flat disc 1, as shown in FIG. 1. The annular receptacle 2 together with the flat disc 1 is unitarily made of aluminum material. When the aluminum-made viscous-type damper is used instead of a ferrous damper, vibration caused by torsional resonance is suppressed in a normal rotation range, so as to inhibit the temperature-up and deterioration of silicone oil or the like received in the receptacle (as disclosed pp.45–48, Report No.943, Seminar of The Society of Automotive Engineers of Japan Inc.).

An opening 3 for the insertion of a crank shaft is formed at the center of the flat disc 1. A ferrous ring 4 is received in the annular receptacle 2, and the cavity between the ferrous ring 4 and the receptacle 2 is filled with silicone oil or the like. Fluororesin cushions 5 or the like may be inserted between the receptacle 2 and the ferrous ring 4, in order to inhibit the direct collision of the ferrous ring 4 against the inner wall of the receptacle 2.

According to a conventional method for manufacturing an aluminum viscous-type damper, the annular receptacle 2 is hermetically sealed in the state that the ferrous ring 4 is received therein, before silicone oil is poured in the receptacle 2. In actuality, the ferrous ring 4 is put in a receptacle 6, and then a cover 7 is attached, as shown in FIG. 2. The cover 7 is fixed to the receptacle 6 in the calking manner such that the upper wall 8 is bent inwards onto the cover 7. In order to inhibit the leakage of silicone oil or the like through the sealed joint, a seal 10 is sandwiched between the upper wall 8 and a flange 9 projecting from the lower periphery of the cover 7, as shown in FIG. 3.

The joint between the receptacle 6 and the cover 7 obtained by the calking method does not have enough strength, so as to easily form the gaps which cause the leakage of oil between the receptacle 6 and the cover 7 in the state that the damper is attached to a crank shaft and repeatedly subjected to centrifugal force, vibration and impact due to high-speed rotation. In addition, the calking method requires the step of thinning the upper wall 8 and the flange 9, so as to increase the number of working steps and working hours.

In order to overcome the defects mentioned above, the feasibility of welding or the like instead of calking has been recently studied. For instance, Japanese Patent Application Laid-Open 63-264282 discloses the method of sealing such a receptacle by high-energy welding such as electron beam welding or laser beam welding. In this case, a ferrous ring is received in the casing, and then the cover is hermetically welded to the casing at the final stage. However, these welding methods require special equipment, so that initial and running costs are higher.

In this regard, the applicability of TIG or MIG welding to the hermetic seal of aluminum members has been studied. According to a conventional welding method, a filler metal as defined in JIS Z3604 is used, and welding conditions such as a welding voltage, a welding current and welding material are selected in relation with the kind and shape of the members to be welded. A welding speed under ordinary conditions is set within the range of 0.2–1.2 m/minute.

The welding speed can be enhanced to approximately 1.5–1.7 m/minute by supplying a pulsed current as a welding current, as disclosed in Japanese Patent Application Laid-Open 3-99780. However, the MIG welding has the upper limit of the welding speed.

When TIG or MIG welding is performed at a high speed, it is difficult to form weld beads having regulated shape with sufficient penetration. The high speed welding would unstabilize arcs generated between the aluminum member to be welded and a welding electrode. Consequently, the welding speed is set to a low level of 1 m/minute as mentioned above.

Since the ordinary slow speed welding causes the increase of input energy per unit length of a weld line, thermal strain is easily accumulated in the welded aluminum member which is relatively soft material. Consequently, the welded members unfavourably deformed. Even when thermal deformation does not occur, the welded aluminum members have poor mechanical strength and involves crackings due to thermal expansion and shrinkage during welding. In addition, since the receptacle is heated at a high temperature during welding, fluororesin or rubber parts can not be inserted in the receptacle before welding.

The big thermal deformation causes the deterioration of vibration-absorbing property, when the damper is attached to a crank shaft. Besides, the MIG welding method is likely to broaden weld beads with big excess metal, so that obtained product have poor external appearance.

These problems occur not only in the case of the aluminum viscous-type damper shown in FIG. 1 and 2, but also in the cases of other receptacles such as an accumulator, water pump, torque converter case, hermetic terminal, liquid tank or gas tank, as far as an aluminum inner member is welded to an aluminum outer member.

Furthermore, aluminum or aluminum alloy has the high thermal conductivity which makes welding difficult. Since an input energy applied to the aluminum member having big heat capacity is diffused into the aluminum member, it is difficult to heat the part to be welded at a temperature necessary for welding. The other member having small heat capacity is rapidly heated by the input energy during welding, and sometimes heated up to an excessively high temperature causing partial deformation. As a result, welding conditions shall be strictly controlled; otherwise weld defects such as burning through or poor shaped weld beads would be formed. In addition, when the joint as shown in FIG. 2 is welded, an arc is likely to turn around the outer side of the upper wall 8 during welding. The turning-around of the arc causes the formation of saggings at the edge of the upper wall 8 or various defects on the surface.

SUMMARY OF THE INVENTION

The present invention is accomplished to overcome these defects as afore-mentioned.

The first object of the present invention is to arc weld aluminum members different in heat capacity from each other without sagging, burning through or the deterioration of material due to excessive input energy.

The second object of the present invention is to provide the jig which covers the aluminum members near the part to be welded and has the function to make heat balance.

The third object of the present invention is to provide the bevel which facilitates penetration even at an ordinary welding speed or which forms narrow weld beads having regulated shape even at a high welding speed.

The fourth object of the present invention is to surely seal a receptacle with the hermetic joint which inhibits the leakage of a fluid such as liquid or gas.

The fifth object of the present invention is to obtain a welded product excellent in dimensional accuracy and external appearance without saggings, burning-through or deformation.

When an aluminum member having small heat capacity is welded to an aluminum member having big heat capacity, a jig having big heat capacity is held in contact with the aluminum member having small heat capacity so as to make a heat balance between the aluminum members to be welded.

In the case where the aluminum member has the width $W_b$ narrower than the broadening of an arc applied onto the surface of the aluminum member, a jig having big heat capacity is held in contact with the face part of the aluminum member which is expected not to be melted down.

In order to inhibit the turning-around of arcs, it is preferable to use the jig having the width satisfying the relationship of $W_j > W_a - W_b$, wherein $W_a$ represents the broadening of an arc on the surface of the aluminum member to be welded, and $W_b$ represents the width of the aluminum member. The jig may have water or air-cooling means incorporated therein.

An aluminum cover may be welded to a cylindrical aluminum casing using the jig whose top surface is at the same height as the upper surface of the casing and the cover, or the jig whose inner flange partially overlaps the upper surface of the casing.

The jig preferably has an inner flange overlapping the surface of the casing. The jig preferably has the height satisfying the relationship of $t_1 \leq 100/t$, wherein t (mm) represents the thickness of the casing at the part to be welded, and $t_1$ (mm) represents the height of the jig from the upper surface of the casing.

The inner flange may be held in contact with the upper surface of the casing or apart from the upper surface of the casing. When the inner flange is held in contact with the casing, it is preferable to adjust the width of the inner flange satisfying the relationship of $t_2 < t$, wherein $t_2$ represents the width of the inner flange overlapping the surface of the casing. When the inner flange is held apart from the surface of the casing, the distance $t_3$ from the upper surface of the casing to the lower surface of the inner flange may be held in the relationship of $t_3 \leq t_2$.

When a welded product having a rounded corner R is expected to be obtained by welding a cover to a casing, the jig has the height lower by the difference of $t_4$ in response to the size of the rounded corner R than the upper surface of the casing. When a disc-shaped cover is welded to a cylindrical aluminum casing, the jig capable of moving along the periphery of the casing can be used. A welding speed is determined within the range of 1–7 m/minute, preferably 2–5 m/minute.

A bevel formed between aluminum members to be welded according to the present invention has at least one jagged groove face. The groove face to be welded may be vertical or inclined. Ridges, dotted projections or knurled grooves are formed on the end face to be welded, so as to promote penetration.

When the aluminum members having the jagged groove face are welded at a high speed, they are butted together and TIG or MIG welded at a welding speed of 2–7 m/minute, preferably 3–5 m/minute. Inert gas such as Ar, He or Ar-He is preferably fed to a welding zone. The use of the inert gas enables the formation of narrow weld beads with deep penetration even at a high welding speed of 2–7 m/minute.

MIG welding is performed under stable conditions suitable for the formation of weld beads having regulated width even at a high welding speed of 2–7 m/minute, by supplying a welding current of 30–280A with voltage of 10–29.5 V. A filler metal is selected in relation with the aluminum member to be welded, as disclosed in JIS Z3604. In order to form narrow weld beads, a filler wire of 0.6–1.6 mm in diameter is preferably used. When the welding speed is set at a normal level of 0.2–1.2 m/minute, welding is performed under the condition that a welding current reduced by 30% at most is supplied to a bevel with a small included angle.

Welding may be performed at a high welding speed of 2–7 m/minute, when the inner member is hermetically sealed to the outer member with the joint capable of inhibiting the leakage of liquid or gas. The inner and outer members may be made of aluminum or aluminum alloy. The welding speed is preferably determined within the range of 3–5 m/minute.

The groove face of the inner and/or outer member may be beveled with an included angle of 30–90 degrees. The root of the bevel may be round-cornered.

The joint design to hold the top surface of the outer member higher than the surface of the inner member effectively inhibits the outflow of molten beads during welding. In this case, the wall thickness $t_a$ (mm) of the outer member is preferably held in the relationship of $1/t_a \leq t_b \leq 50/t_a$ with the difference $t_b$ (mm) of height between the top surface of the outer member and the surface of the inner member. According to this joint design, such the jigs as aforementioned is not neccessarily used.

The outflow of weld beads can be inhibited by using an outer member having the upper wall from which a flange projects outwards, too.

During welding, the mixture of Ar with 50 vol.% more He or sole He is preferably fed as inert gas to a welding zone. The use of the inert gas enables the formation of narrow weld beads with deep penetration, even when the welding speed is high of 2–7 m/minute.

MIG welding is continued under stabilized conditions by adopting a welding current of 30–280A and a welding voltage of 10–29.5 V, even when the welding speed is set at such a high level of 2–7 m/minute. The high-speed welding makes weld beads regularized in shape and narrower, so as to obtain the hermetically sealed weld joint which inhibits the leakage of gas or liquid.

BRIEF DESCRIPTION OF THE DRAWINGS

FIG. 77 is a graph for explaining the effects of welding speed and other method on the deformation of a viscous-type damper.

DETAILED DESCRIPTION OF THE PREFERRED EMBODIMENTS

In the case of welding aluminum members fairly different in heat capacity from each other, damages caused by input energy during welding are significantly bigger than those in a welded ferrous member, since the aluminum members have large thermal conductivity and a relatively low melting point.

Figure 4:
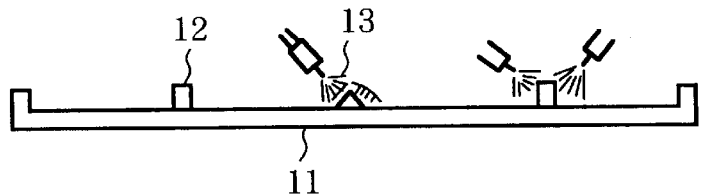
FIG. 4 is a view for explaining the operation of welding a rib to a panel.

When a rib 12 is arc welded to a panel 11 as shown in FIG. 4 for instance, the rib 12 is narrower compared with the broadening of an arc 13. In such the T-shaped joint, saggings are easily formed by the turning-around of the arc 13, so that it is difficult to maintain the predetermined shape of the rib 12. Besides, since a heat balance is not so good between the panel 11 and the lower rib 12 at the T-shaped joint, the rib 12 is excessively heated up to a high temperature compared with the panel 11. Consequently, the material of the rib 12 is softened, and the strength is reduced.

Figure 5:
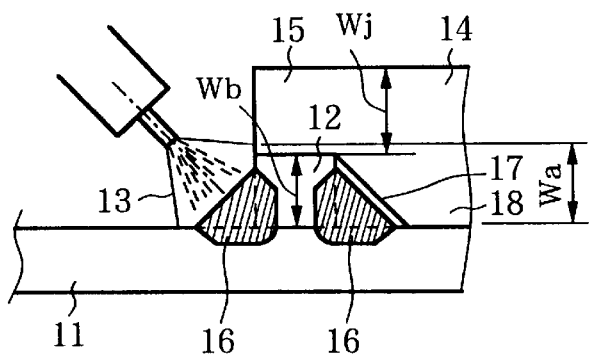
FIG. 5 is a view for explaining the operation of welding aluminum members different in heat capacity using a jig.

According to the present invention, a jig 14 having the configuration shown in FIG. 5 is held in contact with the rib 12 in order to inhibit the turning-around of the arc 13 and the excessive heating of the rib 12.

The jig 14 is preferably made of the material which has high thermal conductivity enough to facilitate heat transfer with the aluminum member to be welded. For instance, an aluminum or copper jig having a larger sectional area than the aluminum member to be welded and the configuration suitable for close fitting to the aluminum member may be used.

The jig 14 shown in FIG. 5 has the pressing part 15 which comes in contact with the top surface of the rib 12. The part between the pressing part 15 and the bottom is defined by an inclined face 17 with an angle corresponding to the shape of weld beads 16.

The pressing part 15 has the width $W_j$ in the relationship of $W_j > W_a - W_b$, wherein $W_a$ represents the broadening of the arc 13, and $W_b$ represents the width of the rib 12. Accordingly, the arc 13 is prevented from turning around the face other than the part of the rib 12 to be welded, and the surface of a welded product has good external appearance free from weld defects such as weld spots.

Figure 6:
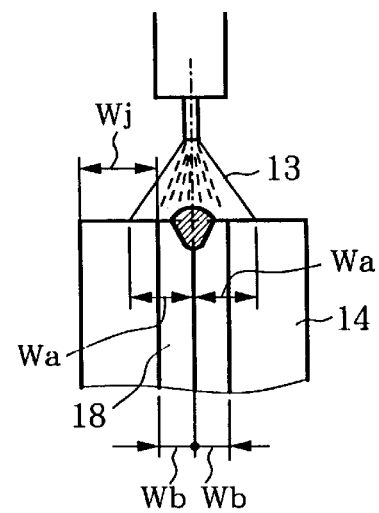
FIG. 6 is another view for explaining the operation of welding aluminum members using a jig, wherein the aluminum members have thickness narrower than the broadening of an arc.

When the arc 13 is directed to the aluminum material to be welded with a right angle, as shown in FIG. 6, a jig 14 having the width $W_j$ in the relationship of $W_j > W_a - W_b$ is used.

The broadening $W_a$ of the arc 13 in this specification means the broadening of the arc 13 applied onto the surface of the aluminum member to be welded, as shown in FIGS. 5 to 8.

Figure 7:
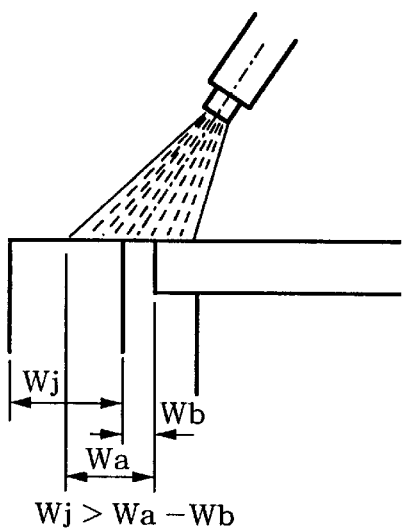
FIG. 7 is a view for explaining the operation of welding an inner member to an outer member using a jig.
Figure 8:
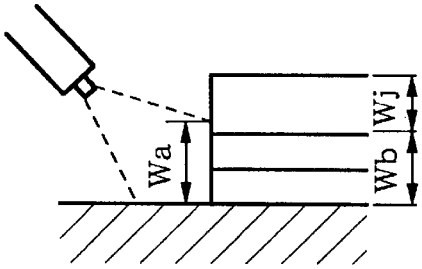
FIG. 8 is a view for explaining the operation of welding three members at once.

The aforesaid dimensional conditions shall be kept when a welding torch is directed to a point apart from the center of a weld line as shown in FIG. 7, or when the welding torch is held with an inclined angle during welding, too. The same is the case when three members are lap welded at the same time as shown in FIG. 8.

The aluminum member to be welded can be covered partially at the part which is expected to be prevented from melting due to the periphery of the arc by the jig having big heat capacity.

When the rib 12 is welded to the panel 11 using the jig 14 having the width $W_j$, a quantity of heat applied to the rib 12 having small heat capacity is transmitted to the jig 14, so that the rib 12 is prevented from excessive heating. Consequently, saggings are not formed even at the corner of the rib 12. Since strains or deformations are inhibited due to the suppression of excessive heating, a welded product is improved in dimensional accuracy.

Figure 9:
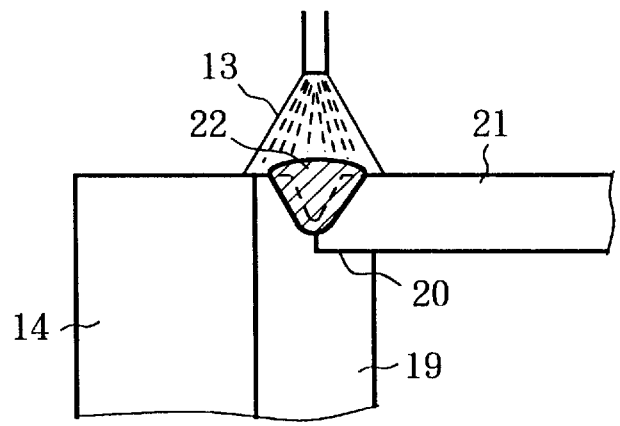
FIG. 9 is a view for explaining the operation of welding a cover to a casing using a jig held in the state pressed onto the outer side of the casing.

In the case of manufacturing a welded product such as the viscous-type damper having a cylindrical casing hermetically sealed with a disc-shaped cover, a jig 14 is held in the state pressed onto the outer side of the casing 19 as shown in FIG. 9. The cover 21 is inserted into a step 20 formed at the upper end of the casing 19.

Figure 10:
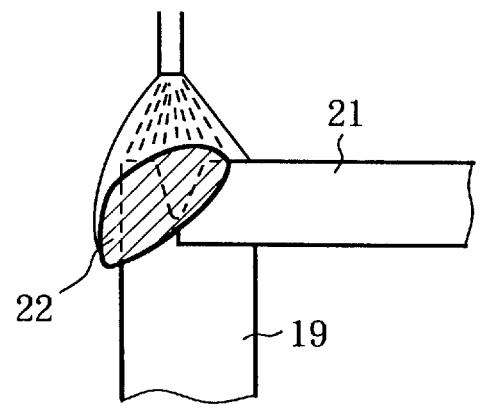
FIG. 10 is a view for explaining sags formed at a welded product without a jig.

When the cover 21 is arc welded to the casing 19, the arc 13 is prevented from turning around the outside face of the casing 19 by the jig 14. As a result, the initial external appearance of the casing 19 can be kept after being welded, and a weld bead 22 formed at the joint is regulated in shape. If the cover 21 is welded without using the jig 14, the weld beads would be sagged, and the corner of the casing 19 would be rounded due to melting during welding, as shown in FIG. 10. Consequently, the welded product has poor external appearance as well as poor dimensional accuracy.

Figure 11:
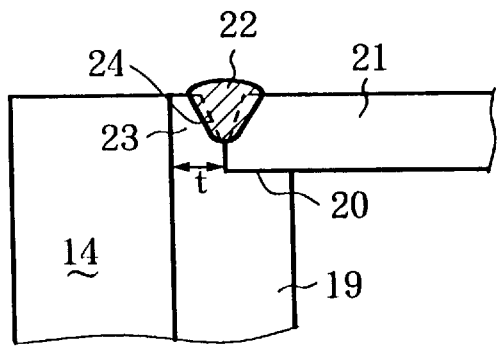
FIG. 11 is a view for explaining the operation of hermetically sealing a cover to a receptacle using a jig.

In a joint design for hermetically sealing the casing 19 with the cover 21, a step 20 is preferably formed at the top end of the casing 19, and the wall of the casing 19 at a joint 23 is made thinner to a value t, as shown in FIG. 11. The cover 21 is inserted into the casing 19 in the state that the side edge of the cover 21 is in contact with the step 20. After a bevel 24 is optionally formed, the cover 21 is hermetically welded to the casing 19.

Figure 12:
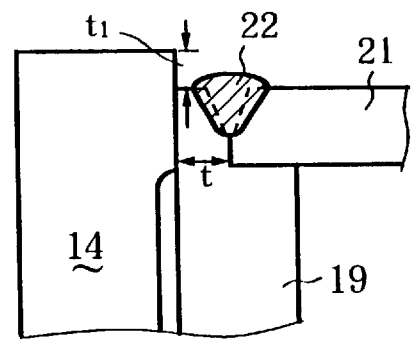
FIG. 12 is a view for explaining the operation of hermetically sealing a cover to a receptacle using a jig higher than the receptacle.

In this case, the turning-around of the arc is accurately inhibited by using a jig 14 projecting from the upper surface of the casing 19, as shown in FIG. 12. The height $t_1$ (mm)

of the jig 14 projecting from the upper surface of the casing 19 preferably satisfies the relationship of $t_1 \leq 100/t$ with the thickness t (mm) of the joint 23. Even when the heigh $t_1$ exceeds the value of 100/t, the turning-around of the arc 13 could be inhibited. However, since the height $t_1$ is set above 20 mm in correspondence to t=5 mm for example, weld defects derived from poor shielding would be formed in response to the higher position of a welding torch.

Figure 13:
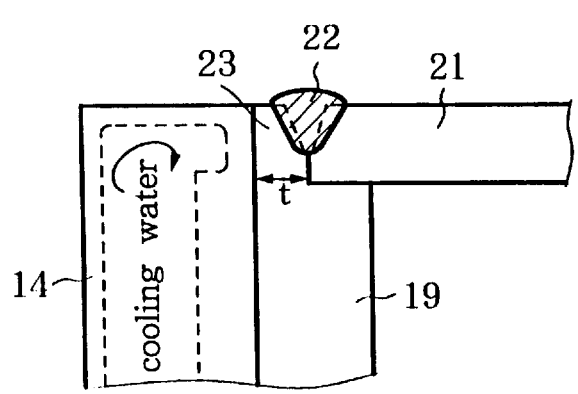
FIG. 13 is a view for explaining the operation of hermetically sealing a cover to a receptacle using a water-cooled jig.

The jig 14 may have water or air-cooling means incorporated therein, as shown in FIG. 13. Such the jig 14 facilitates the diffusion of a heat from the thin-walled joint 23, so as to prevent the joint 23 from excessive heating.

Figure 14:
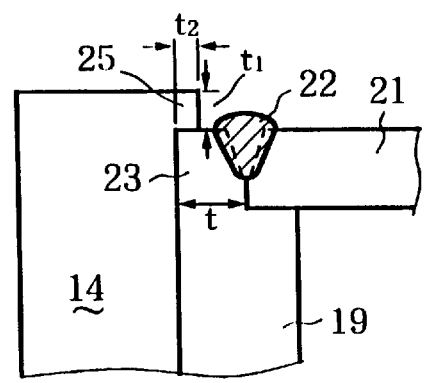
FIG. 14 is a view for explaining the operation of hermetically sealing a cover to a receptacle using a jig having an inner flange.

The jig 14 may have an inner flange 25 for partially pressing the top end of the casing 19, as shown in FIG. 14, in order to assure the width of a melting zone on the upper surface of the joint 23. The part of the inner flange 25 for partially pressing the top surface of the casing 19 shall have shorter length $t_2$ compared with the thickness t of the joint 23 in order to retain the part to be welded.

Figure 15:
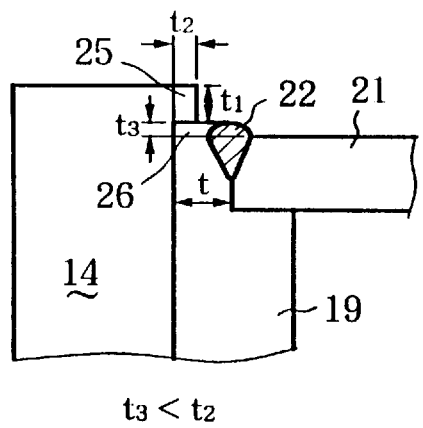
FIG. 15 is another view for explaining the operation of hermetically sealing a cover to a receptacle using a jig having an inner flange.

In this case, a gap 26 may be formed between the upper surface of the casing 19 and the inner flange 25, as shown in FIG. 15. The distance $t_3$ of the gap 26 is advantageously determined shorter than the length $t_2$ of the inner flange 25 overlapping the top surface of the casing 19. If the distance $t_3$ is longer than the length $t_2$, the effect to reduce the width of the surface part of the casing 19 to be melted by the welding arc would be too weak, resulting in the melting of the inner flange 25.

Figure 16:
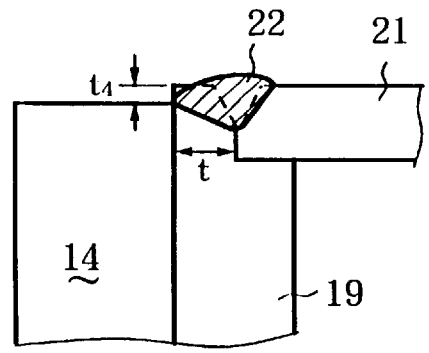
FIG. 16 is a view for explaining the operation of hermetically sealing a cover to a receptacle using the jig which makes the corner of the casing rounded.

In the case of manufacturing a welded product having a rounded corner, a jig 14 lower by the difference $t_4$ in height compared with the top surface of the casing, as shown in FIG. 16 is preferably used. Such the jig 14 effectively utilizes the turning-around of the arc so as to form the rounded corner. For instance, when the difference $t_4$ in height is set to 2 mm, a rounded corner of 2 mm in radius is formed by the surface and boundary tensions of molten metal at the upper periphery of the casing 19 due to the turning-around of the arc.

Figure 17:
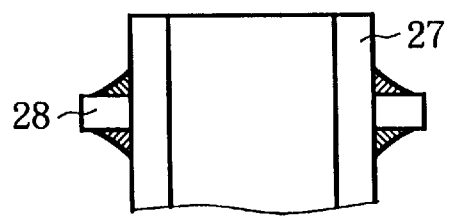
FIG. 17 is a view for explaining the objective design to weld a flange to a pipe.

The jig is applicable for welding a flange 28 to a cylindrical pipe 27 as shown in FIG. 17, too. Since the flange 28 is fairly smaller than the pipe 27, the heat capacity of the flange 28 is much smaller than that of the pipe 27.

Figure 18:
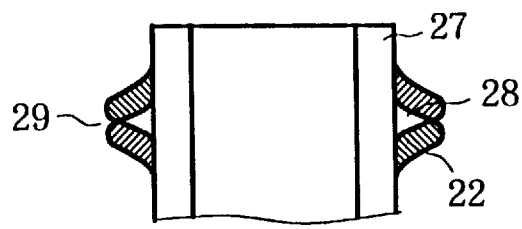
FIG. 18 is a view for explaining the welded state wherein a flange is deformed.

According to a conventional welding method, the flange 28 is excessively heated so that sagging 29 is formed at the flange 28 as shown in FIG. 18. In an extreme case, a weld bead 22 is built up to the side face of the flange 28. Consequently, the welded product does not have a predetermined shape with dimensional accuracy.

Figure 19:
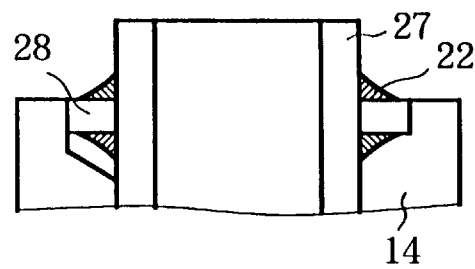
FIG. 19 is a view for explaining the operation of welding a flange to a pipe using a jig.

In this case, a jig 14, as shown in FIG. 19, having a cavity for receiving the pipe 27 and an inner surface to be held in contact with the side face of the flange 28 is used. When welding is performed under the condition that the side face of the flange 28 is covered with the jig 14, a weld heat concentratedly applied to the flange 28 during welding is diffused to the jig 14. As a result, the flange 28 is prevented from overheating, and strains or deformations due to input energy are suppressed. Since the side face of the flange 28 is covered with the jig 14, the turning-around of the arc is inhibited, and the flange 28 after being welded is kept in its initial good external appearance.

Figure 20A:
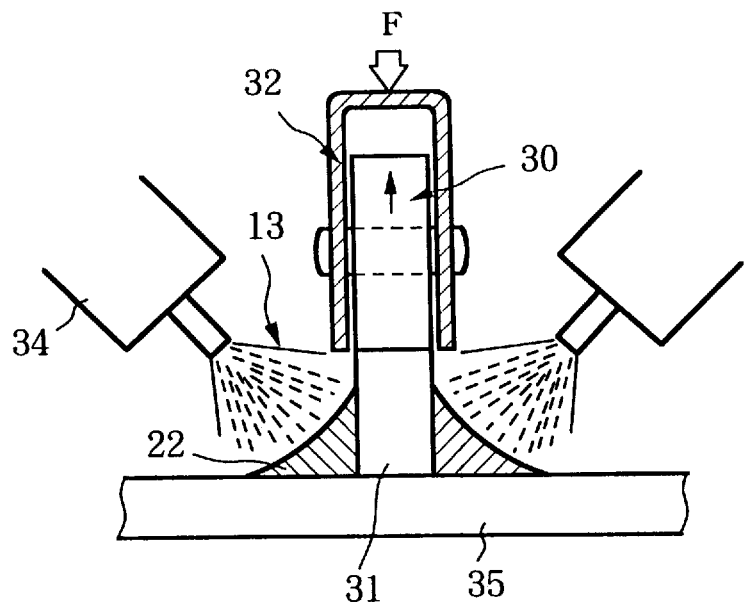
FIG. 20A is a sectional view for explaining the operation of welding a rib to a panel using a roller jig pressed onto the rib.
Figure 20B:
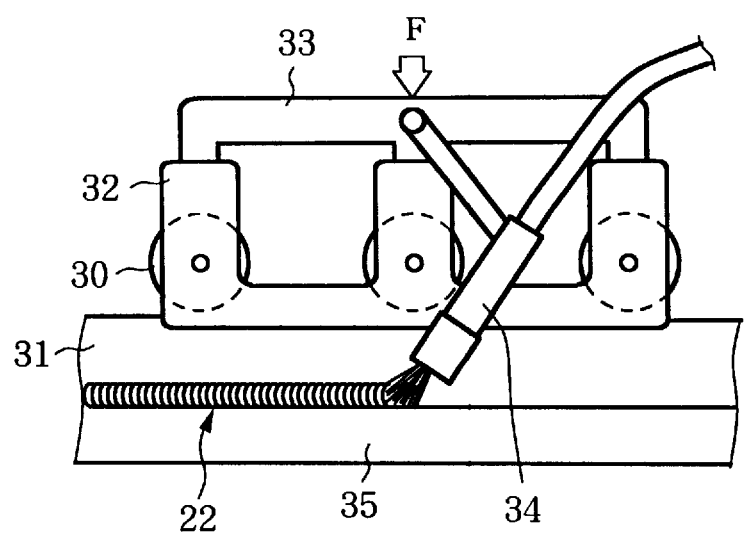
FIG. 20B is a side view for explaining the same welding operation.

In the case of welding a rib to a panel, a rotatable roller jig 30 as shown in FIGS. 20A and 20B may be used. The roller jig 30 is pivoted to a sagging-inhibitor frame 32 clamping the rib 31, and pressed onto the side face of the rib 32, as shown in FIG. 20A. A plurality of such roller jigs 30 may be provided along a welding direction, as shown in FIG. 20B. In this case, a pressure F is applied through a main frame 33 to the sagging-inhibitor frame 32 which pivots the roller jigs 30, 30. . . , so that each roller jig 30 is pressed onto the rib 31 with the same pressure.

When a welding torch 34 is attached to the main frame 33, the movement of the roller jigs 30, 30. . . is synchronized with the welding torch 34. The rib 31 is fillet welded to the panel 35 with high dimensional accuracy, since the rib 31 while being welded is successively pressed onto the panel 35 at proper points by the roller jigs 30, 30. . .

The weld bead 22 having regulated shape is formed at the corner between the panel 35 and the rib 31. Since the side face of the rib 31 is covered with the roller jigs 30, 30. . . and the sagging -inhibitor frame 32, the arc 13 is prevented from turning around the side face of the rib 31. Consequently, the welded product has good external appearance.

A jig rotatable along the periphery of the casing as shown in FIGS. 21, 22 or FIGS. 23, 24 may be used for hermetically welding a cover to a cylindrical casing.

Figure 21:
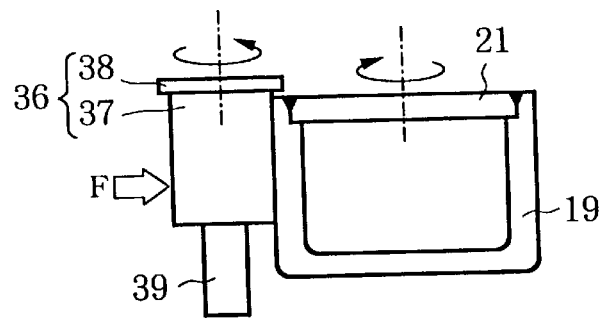
FIG. 21 is a view for explaining the operation of welding a cover to a receptacle using a roller jig.
Figure 22:
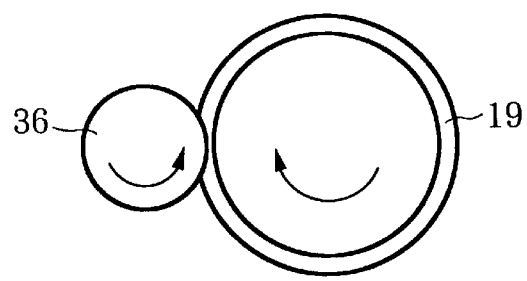
FIG. 22 is a plan view for explaining the same welding operation.

The jig 36 shown in FIGS. 21 and 22 has a flange 38 unitarily formed with a cylindrical body 37 at its top end. The jig 36 is rotated around its axis 39. The cylindrical body 37 comes in contact with the outside face of the casing 19, while the flange 38 overlaps the upper surface of the casing 19. The cylindrical body 37 is pushed onto the outside face of the casing 19, and the casing 19 or the jig 36 is relatively rotated as shown in FIG. 21. Consequently, the jig 36 is carried along the periphery of the casing 19.

Figure 23:
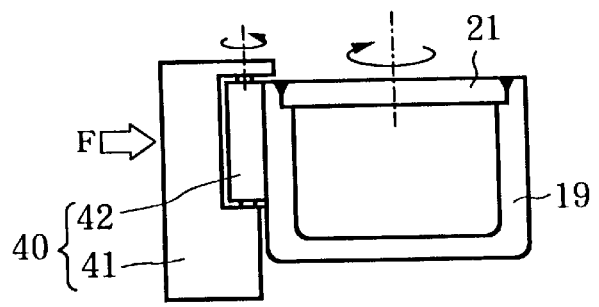
FIG. 23 is a view for explaining the operation of welding a cover to a receptacle using a jig having a plurality of rollers pressed onto the outer side of the receptacle.
Figure 24:
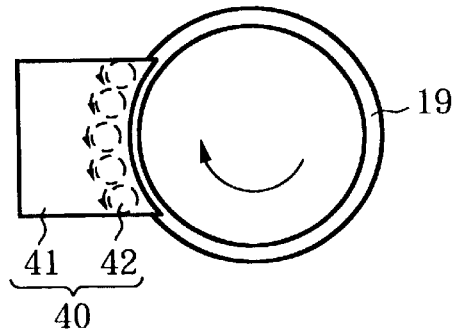
FIG. 24 is a plan view for explaining the same welding operation.
Figure 25:
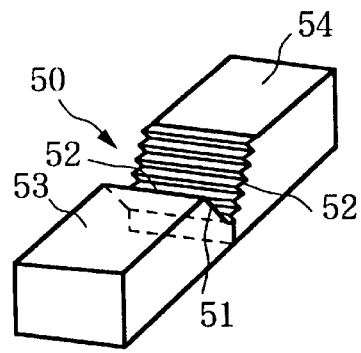
FIG. 25 is a view illustrating a bevel having groove faces jagged by the formation of ridges.
Figure 26:
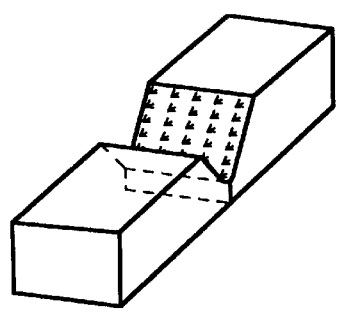
FIG. 26 is a view illustrating a bevel having groove faces jagged by the formation of dotted projections.

The jig 40 shown in FIGS. 23 and 24 comprises the main body 41 whose inner surface is curved along the periphery of the casing 19 and a plurality of rollers 42 rotatably provided at the inner surface of the main body 41. The jig 40 is carried along the periphery of the casing 19, when the casing 19 or the jig 40 is relatively rotated as shown in FIG. 24.

Figure 27:
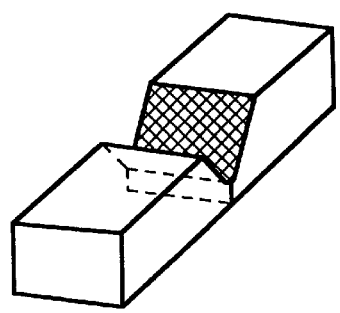
FIG. 27 is a view illustrating a bevel having groove faces jagged by knurling.

In the joint geometry according to the present invention, a bevel 50 is formed at the groove faces 51, 52 of the aluminum member 53, 54 to be welded, as shown in FIGS. 25–28. Ridges in FIG. 25, dotted projections in FIG. 26 or knurled grooves in FIG. 27 are formed on the groove faces 51, 52 so as to reform the end faces 51, 52 into jagged state.

Figure 28:
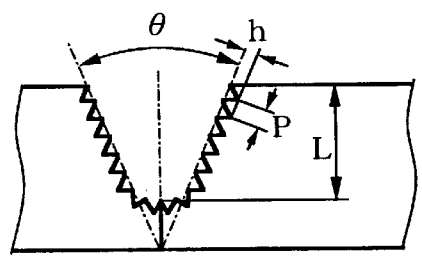
FIG. 28 is a view for explaining the shape and dimensions of a joint geometry.

The jaggedness is preferably controlled to satisfy the relationships of $P=L/(3-50)$ and $h=P \times (0.3-5)$, wherein L (mm) represents groove depth, P (mm) represents the pitch of the jaggedness and h (mm) represents the height of the jaggedness, in the joint geometry shown in FIG. 28.

If the pitch P of the jaggedness exceeds L/3, poor fusion would be formed in the dent parts without the increase of penetration. If the pitch P is below L/50, the effective height h is too small to promote deep penetration. The height h of the jaggedness is determined in relation with the pitch P. If the height h is less than 0.3×P but exceeds L/3, inferior fusion would be formed at dent parts. If the height h is less than both 0.3×P and L/50, the weld bead would be formed with the same poor penetration as that of a normal bevel having flat groove faces. If the height exceeds both 5×P and L/3, inferior fusion would be formed at dent parts. If the height h exceeds 5×P but below L/50, inferior fusion would be formed at dent parts, although enough penetration is obtained. In the latter case, machining after welding would be difficult, too.

Figure 29:
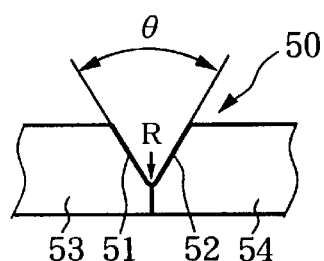
FIG. 29 is a view for explaining a bevel having both groove faces inclined.
Figure 30:
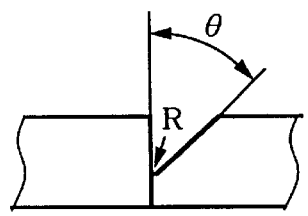
FIG. 30 is a view for explaining a bevel having one groove face inclined.
Figure 31:
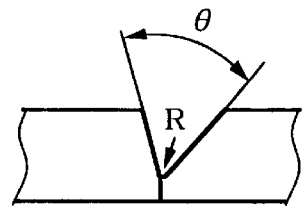
FIG. 31 is a view for explaining a bevel having each groove face inclined with different angle.
Figure 32:
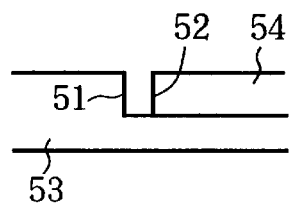
FIG. 32 is a view for explaining a bevel having vertical groove faces.

Either one or both of the groove faces 51, 52 may be inclined, as shown in FIG. 29 or 30, respectively. An included angle θ is preferable of 25–90 degrees. The root of the bevel 50 may be round cornered R, as shown in FIG. 31. The jaggedness may be applied to the vertical groove faces 51, 52, as shown in FIG. 32.

The jagged parts formed on the groove faces 51, 52 shown in FIGS. 25 to 28 are preferentially heated and melted due to the concentration of arc heat during welding, so that the jaggedness serves as starting points for penetration. Consequently, a supplied filler metal is well melted together with the jagged parts held in heated molten state, resulting in the promotion of penetration. Therefore, weld beads having regulated shape are formed without poor penetration, even when a welding speed is set at a high level of 2–7 m/minute, or when the aluminum members 53, 54 are welded with a small quantity of input energy compared with a conventional method.

The weld beads formed in this way is sufficiently narrower and does not put any harmful influence on the external appearance of the welded aluminum body. Since a quantity of applied heat is suppressed at a lower level due to the high-speed welding or small input energy, the welded body is prevented from thermally deforming. In addition, the welded joint has high strength due to sufficient penetration.

On the contrary, when aluminum members having flat groove faces without jaggedness are welded with the same input energy at the same welding speed, the welded joint has inferior strength due to poor penetration.

Under the condition to apply ordinary input energy, the welding speed is determined within the range of 2–7 m/minute. The high-speed welding effectively suppresses deformation and strain caused by weld heat, and facilitates the formation of narrow weld beads having excellent external appearance. As a result, post-treatment such as reforming or machining is not necessary after welding. The slow welding speed below than 2 m/minute would cause the broadening of weld beads, big excess metal or deformation. The too-much high welding speed above 7 m/minute reduces penetration, resulting in the formation of a welded joint having inferior strength.

When aluminum members different in thickness from each other are welded, the member having smaller heat capacity is likely to be excessively heated. While, the other member serves as a heat sink and is hardly heated up to a temperature necessary for welding. As a result, poor fusion is likely to be formed between the aluminum members, as shown in FIG. 33.

Figure 34:
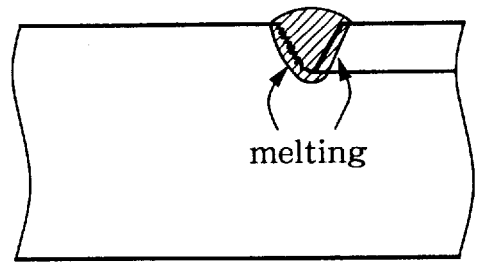
FIG. 34 is a view for explaining the formation of good weld bead when the heat balance between aluminum members is stabilized.

The heat balance between the aluminum members is stabilized by jaggedness formed on the groove face of the thicker member through which a heat is easily diffused, as shown in FIG. 34. Due to the jaggedness, both the groove faces start melting at the same time, so as to make the control of welding conditions easy.

Figure 33:
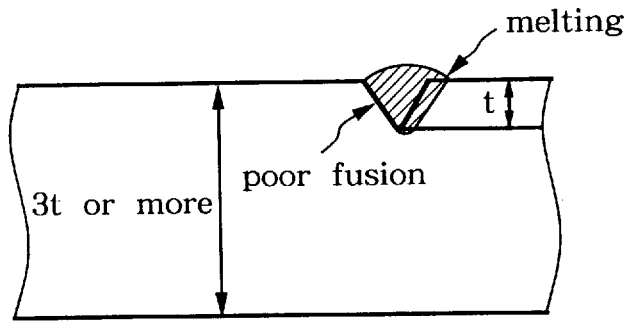
FIG. 33 is a view for explaining the formation of weld defects when aluminum members unbalance from each other in heat capacity are welded.

If the aluminum members different in thickness are TIG or MIG welded at a normal welding speed of 0.2–1.2 m/minute, a heat balance would be unstable as shown in FIG. 33. Consequently, the thick member is insufficiently melted, and poor fusion easily occurs. In order to melt the thicker member in this case, input energy is necessarily set at a higher level by adjusting a welding current or a welding voltage. However, the increase of the input energy is excessive to the thinner member, resulting in cracking or poor strength.

When the groove face of the thicker member is jagged as shown in FIG. 34, it is possible to make a good heat balance between the aluminum members during welding with small input energy. Consequently, crackings or the deterioration of strength are inhibited. The small input energy is effective for forming a welded joint while suppressing deformation, too.

The depth of penetration may be controlled by the included angle θ (shown in FIG. 29). The included angle θ is preferable of 25–90 degrees in order to obtain the necessary depth of penetration. Although the groove depth is not particularly limited, the included angle is determined within the range of 40–70 degrees for a bevel with the groove depth of 1.0–2.5 mm so that a welded joint with sufficient penetration is formed by small input energy at a normal welding speed.

When the root of the bevel 15 is round-cornered R (shown in FIGS. 30 and 31), a fused part with 0.3 mm or deeper penetration from the bottom of the bevel is formed. Such the fused part improves weld strength and impact resistance, and the welded joint is hermetically sealed. The corner R depends on the included angle θ. When the included angle θ is small, the corner R is made larger. When the included angle θ is larger, the corner R is made smaller. For instance, the corner R is set to 0.2 mm at the included angle θ of 90 degrees, or set to 1 mm at the included angle θ of 25 degrees.

Figure 35:
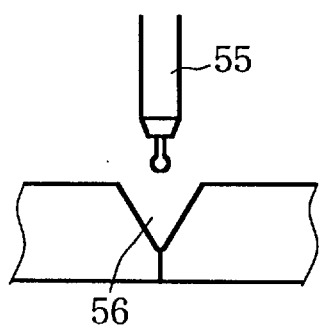
FIG. 35 is a view illustrating a welding torch directed to a bevel.
Figure 36:
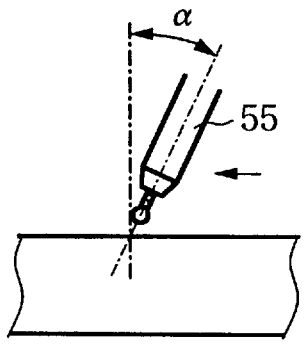
FIG. 36 is a view showing the advancing angle of a welding torch.
Figure 37:
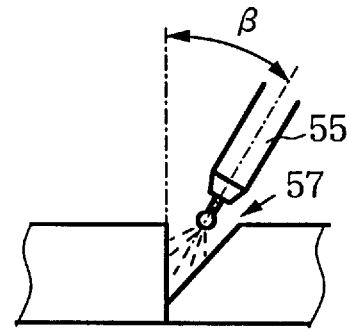
FIG. 37 is a view showing the targeting angle of a welding torch.

A welding torch 55 is directed to the bevel 56 during welding, as shown in FIG. 35. The welding torch 55 is held with an advancing angle α (shown in FIG. 36) of 3–15 degrees and a targeting angle β (shown in FIG. 37) of 0–35 degrees. If the advancing angle α is below 3 degrees, a zone for cleaning the members to be welded would be narrower so that formed weld beads would have poor external appearance. If the advancing angle α exceeds 15 degrees, formed weld beads would be broader with poor penetration. If the targeting angle β exceeds 35 degrees, the length of an arc reaching the welded members would be unbalanced so that undercut would be formed at the toe 57 of weld at the shorter arc side.

A welding speed is ordinarily determined within the range of 0.2–1.2 m/minute as defined in JIS Z3604, when aluminum material is MIG welded. However, such a slow welding speed causes the increase of input energy per unit length of the material to be welded, resulting in the deformation of the welded material or the deterioration of inner members as afore-mentioned. Due to these problems, the MIG welding has been regarded as unapplicable for making a viscous-type damper or the like as a vibration absorber to be attached to a crank shaft.

We have researched the effect of a MIG welding speed on the reduction of input energy and found that narrow weld beads having regular width are surely formed without defects such as unstable arc or poor penetration, when the welding speed is controlled within the range of 2–7 m/minute. The weld bead formed in this way has the depth of penetration sufficient to inhibit the leakage of liquid such as silicone oil, gasoline or water poured in a receptacle and the invasion of air into a receptacle whose interior is decompressed or held in vacuum.

The high speed welding remarkably reduces input energy, so as to suppress the deformation of welded members. Consequently, a product excellent in external appearance is obtained. These advantages derived from the increase of the welding speed can not be expected from conventional MIG welding.

When the welding speed is held within the range of 2–7 m/minute, narrow weld beads excellent in external appearance are formed, while suppressing deformation and strain caused by welding. Consequently, post-treatment such as reforming is not necessary after welding. In addition, since excess metal is not so big, making-up such as machining after welding may be omitted or lightened. If the welding speed is slower than 2 m/minute, the welded material would be deformed with wide welded beads and too deep penetration. If the welding speed is higher than 7 m/minute, a weak welded joint would be formed due to poor penetration.

When thin outer and inner members are welded, a weld joint with sufficient penetration is formed without the necessity of beveling. However, when thick outer and inner members are welded, or when much penetration is expected to be promoted, such a bevel as mentioned above is preferably formed at the groove face of the outer and/or inner members.

The depth of penetration can be controlled by an included angle θ (shown in FIG. 29). In order to obtain enough depth of penetration, the included angle θ is preferably held within the range of 30–90 degrees. Groove depth is preferably 4 mm or less, although it does not limit the scope of the present invention. A welded joint with sufficient penetration can be made even by small input energy, when the bevel angle θ is determined within the range of 45–75 degrees for groove depth of 1.0–2.5 mm.

When the root of the bevel is round-cornered R as shown in FIGS. 29–31, a fused part with penetration of 0.3 mm or more in depth from the bottom of the groove is formed. Said fused part effectively improves weld strength and impact resistance, so as to obtain a hermetically welded joint.

Figure 1:
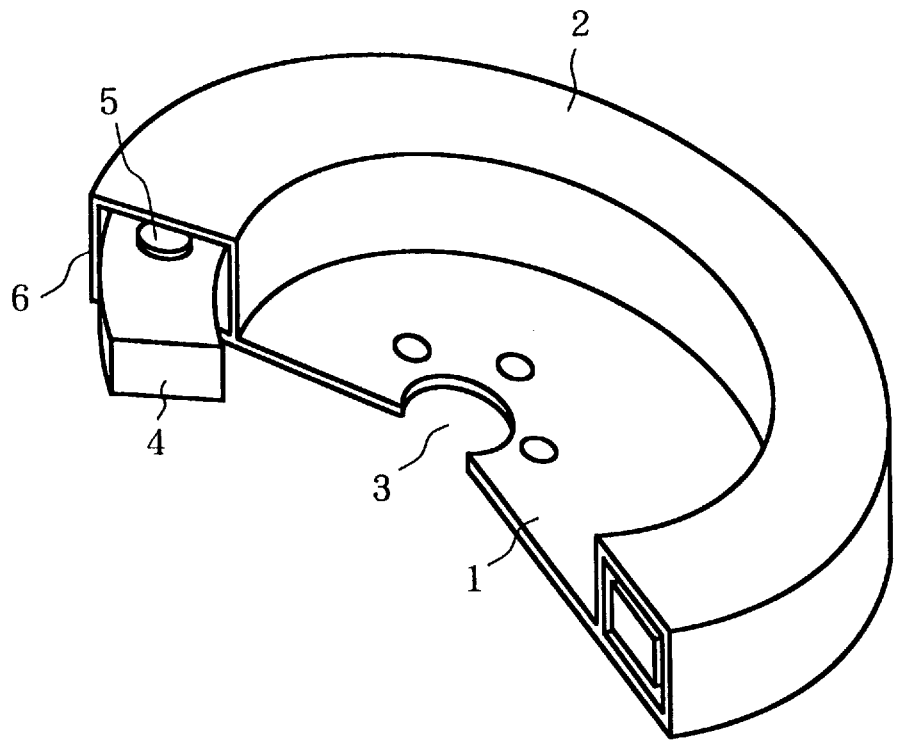
FIG. 1 is a bird's eye view illustrating a viscous-type damper partially cut off.
Figure 2:
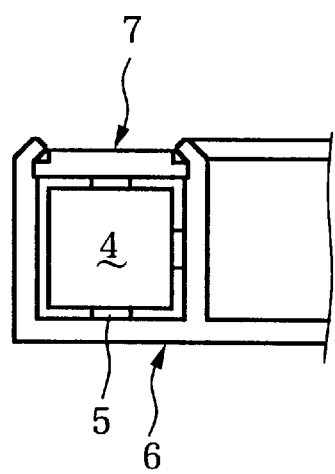
FIG. 2 is a sectional view showing the part of a conventional viscous-type damper.
Figure 3:
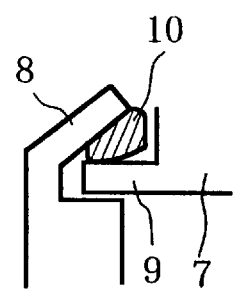
FIG. 3 is a sectional view showing the sealed part of the conventional viscous-type damper.
Figure 38:
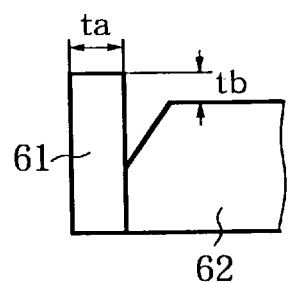
FIG. 38 is a view for explaining the bevel formed between a cornered cover and a receptacle.
Figure 39:
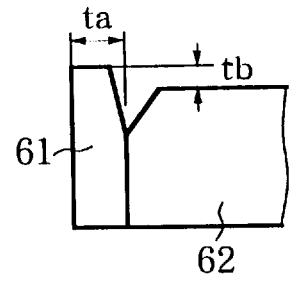
FIG. 39 is a view for explaining the bevel formed by between the the groove faces of aluminum members inclined with different including angles.

When an outer member corresponding to the receptacle body 6 shown in FIG. 2 is thin, it is preferable to provide the difference $t_b$ between the outer member 61 and the inner member 62, as shown in FIG. 38 or 39. The inner member 62 may be only beveled (FIG. 38), or both of the outer member 61 and the inner member 62 may be beveled (FIG. 39).

Figure 40:
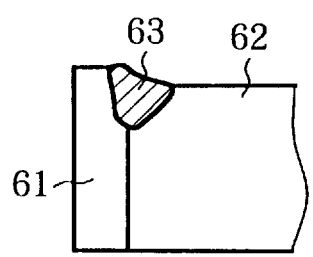
FIG. 40 is a view for explaining the welded joint formed by welding a cornered cover to a receptacle.
Figure 41:
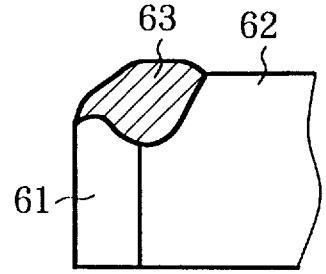
FIG. 41 is a view for explaining a welded joint with saggings.

The difference $t_b$ of height is adjusted within the range of $1/t_a$–$50/t_a$, wherein ta represents the thickness of the outer member 61. The defined value $t_b$ assures the formation of a good weld bead 63 as shown in FIG. 40 without the turning-around of the weld bead 63 to the outer member 61. If the difference $t_b$ of height is smaller than $1/t_a$, the weld bead 63 would turn around the outer member 61 as shown in FIG. 41 and form the sags which put harmful influence on external appearance. If the difference $t_b$ of height exceeds $50/t_a$, the part of the outer member 61 projecting from the surface of the inner member 62 is too long just like fillet welding, resulting in poor weldability. When the difference $t_b$ does not exceed $5/t_a$, post-treatment such as cutting off the projecting part after welding can be omitted, so that productivity is improved.

Figure 42:
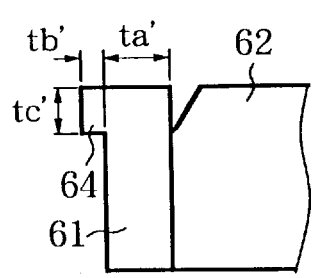
FIG. 42 is a view illustrating a joint geometry for hermetically sealing a receptacle with a cover.
Figure 43:
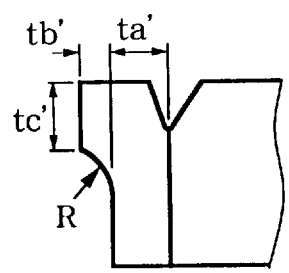
FIG. 43 is a view illustrating another joint geometry for hermetically sealing a receptacle with a cover.

The saggings which are likely to be formed at a thinner outer member 61 can be inhibited by the formation of a flange extending outwards from the upper part of the outer member. FIG. 42 shows a flange 64 of thickness $t_c'$ extending by length $t_b'$ from the side of the outer member 61. FIG. 43 shows a flange 64 having a root with a round corner R formed by the same way. In this case, one or both of the outer member 61 and the inner member 62 may be beveled, too.

Figure 44:
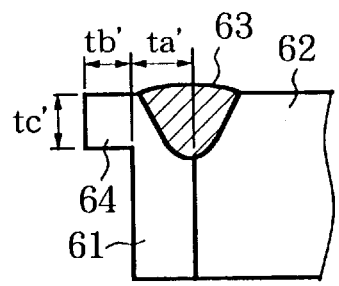
FIG. 44 is a view showing the formation of a weld bead for hermetically sealing a receptacle with a cover.

The flange 64 inhibits the formation of saggings due to input energy during welding at the outer member 61 and effectively forms a good weld bead 63 as shown in FIG. 44. When the length $t_b'$ (mm) of the flange 64 is adjusted in the range of $1/t_a'$ –$50/t_a'$ with the thickness $t_a'$ (mm) of the outer member 61, a good weld bead 63 is formed without saggings at the outer member 61. Especially when the length $t_b'$ of the flange 64 is designed in 5 times the thickness $t_a'$ or less, post-treatment such as cutting off an unnecessary part can be omitted. The thickness $t_c'$ of the flange 64 is preferably held within the range of 1–5 times the length $t_b'$.

Figure 45:
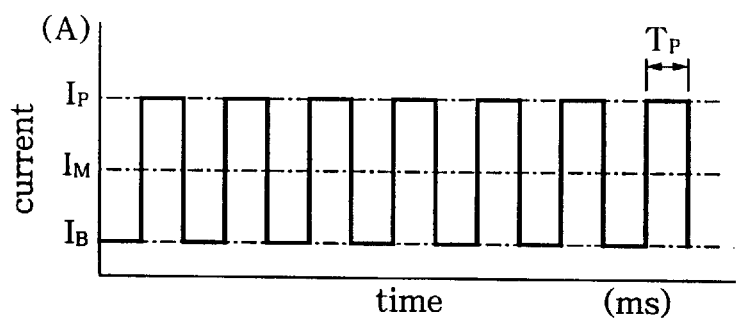
FIG. 45 is a graph illustrating the wave pattern of a welding current.

Welding conditions are determined within the range of welding current 30–280A and welding voltage 10–29.5 V in response to a welding speed and/or joint geometry. Although D.C. may be used, a pulsed current is effective for obtaining deep pentration with small input energy. The representative pulsed current may be a rectangular pulsed current as shown in FIG. 45. A peak current $I_P$ and a base current $I_B$ are preferably adjusted in the relationships of $I_P$=(1 to 2.5)×$I_M$ and $I_B$=(0.2 to 1)×$I_M$, respectively, with an effective current $I_M$. A period $T_p$ for supplying the peak current $I_P$ is preferably selected within the range of 0–2.3 milliseconds.

If the peak current $I_P$ exceeds 2.5 times the effective current $I_M$, weld defects such as undercut are likely to be formed at the toe of weld. If the base current $I_B$ is below 0.2 times the effective current $I_M$, weld beads having irregular shape would be formed due to unstable arc. The peak current $I_P$ and the base current $I_B$ may be changed up to the same level as the effective current $I_M$, so as to inhibit the formation of undercut. A welded part with penetration of 0.3 mm in depth is formed by the supply of the current, i.e. D.C., whose peak current $I_P$ and base current $I_B$ are equal to the effective current $I_M$. However, the use of a pulsed current is preferable in order to reduce sputtering and to obtain the 0.3 mm or more depth of penetration and to reduce input energy in total.

The outer member 61 and the inner member 62 are welded by one or two passes. If the welding is repeated more than 2 passes, defects such as blow holes and crackings would be likely to form in a weld metal including the welded part and the filler. In addition, too much repetition of welding causes the increase of input energy, so that the deformation or strain of the welded material could not be suppressed within the range of 0.3 mm or less. In this regard, one pass welding is most preferable.

The mixture of Ar with 50 vol.% He or sole He is preferably fed as inert gas to a welding zone. A weld bead can be made narrower, and the depth of penetration can be made deeper as the increase of He content in the inert gas. As a result, good weld beads meeting with the requisitions for use are formed.

The inner member may be coupled with the outer member by shrinkage fitting, chilling, pressing before welding. When the members are constrained by jigs or tack welding, the inner member can be welded to the outer member without such inserting methods. In this case, welding is not impeded even if there is a gap between the inner and outer members.

EXAMPLES

Figure 46:
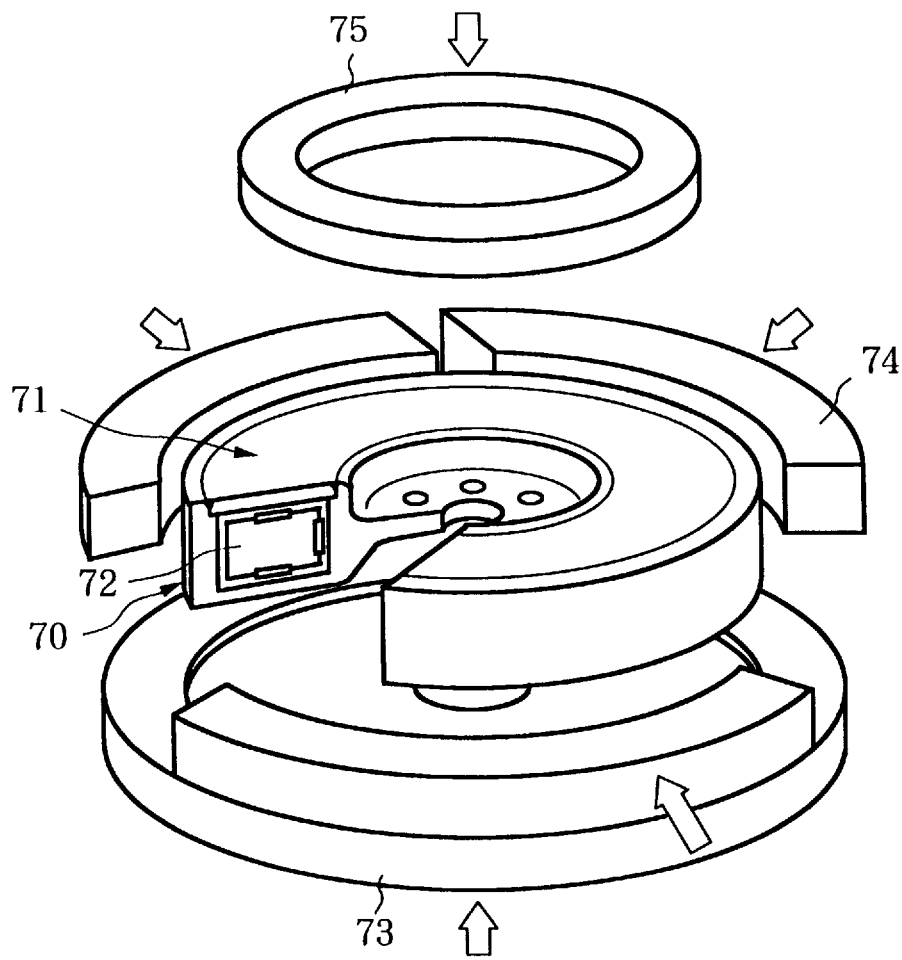
FIG. 46 is a bird's eye view illustrating a viscous-type damper in Example 1.
Figure 47:
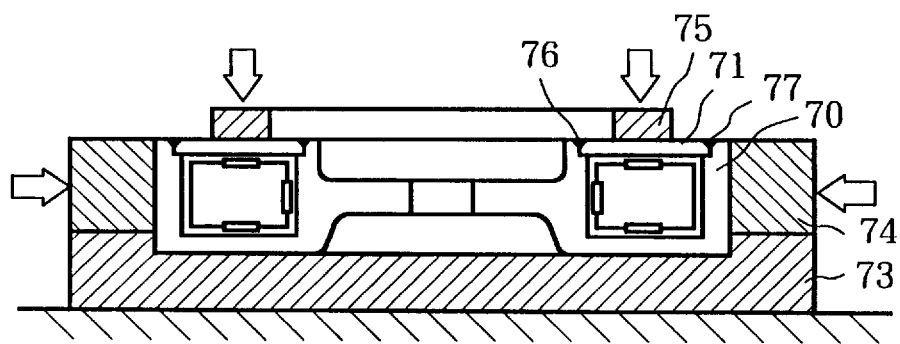
FIG. 47 is a sectional view illustrating the same damper.

Example 1:

The following example explains the application of the present invention to hermetically welding a cover to the receptacle (casing) of a viscous-type damper shown in FIGS. 46 and 47.

The receptacle 70 was made of a forging aluminum alloy JIS A6061 and had an annular cavity of 264 mm in outer diameter, 177 mm in inner diameter and 24 mm in depth unitarily formed at the periphery of a flat disc. The cover 71 which was welded to the receptacle 70 to hermetically seal the annular cavity was made from a sheet of the same aluminum alloy JIS A 6061 and had a disc-shape of 264 mm in outer diameter, 177 mm in inner diameter and 4 mm in thickness.

Before the receptacle 70 which received a ferrous ring 72 in its annular cavity was hermetically sealed with the cover 71 by welding, the receptacle 70 was mounted on a lower jig 73 and pressed toward the center by a side jig 74. A dent part corresponding to the profile of the lower part of the receptacle 70 was formed at the lower jig 73, for stationarily supporting the receptacle 70. The side jig 74 was divided to several pieces along a circumferential direction. FIG. 46 shows the constitution that the side jig 74 to be pressed onto the outside face of the receptacle 70 was divided to three pieces. After the lower and outside faces of the receptacle 70 were supported with the lower jig 73 and the side jig 74, respectively, the cover 71 was attached to the upper opening of the receptacle 70. The cover 71 was formed to a ring-shaped disc fitting to the annular cavity of the receptacle 70. The cover 71 was pressed onto the receptacle 70 by a force applied to the cover-pressing jig 75 which was a ring-shaped disc slightly narrower than the width of the cover 71.

When the cover pressing jig 75 was located on the cover 71, the parts 76, 77 between the receptacle 70 and the cover 71 to be hermetically sealed were exposed inside and outside the cover-pressing jig 75, respectively.

Figure 48:
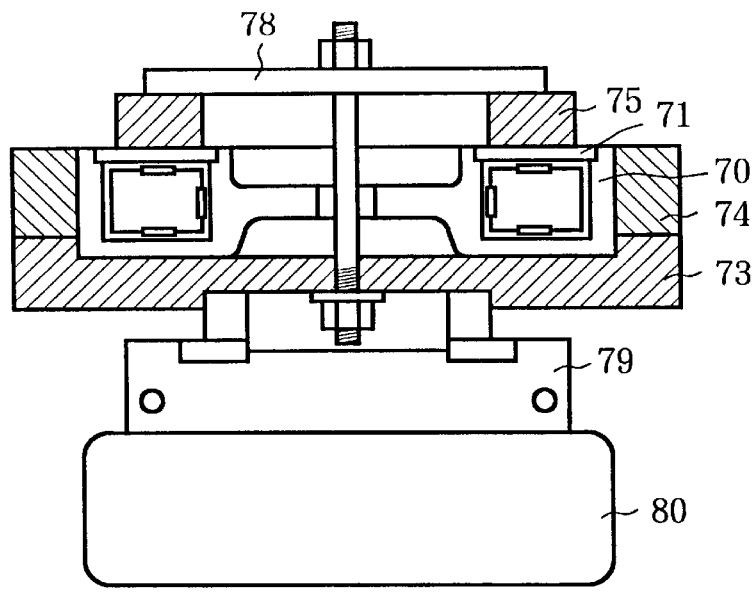
FIG. 48 is a sectional view for explaining the operation of welding the same damper using a rotary jig.

After the positional relationship of the receptacle 70 with the cover 71 was fixed by the jigs 73–75, the receptacle 70 together with the cover 71 was clamped with a damper 78 and then supported with a chuck 79, as shown in FIG. 48. In this state, the parts 76, 77 were hermetically sealed by welding while rotating the receptacle 70 together with the cover 71 by a motor 80.

A bevel formed between the parts 76, 77 to be hermetically sealed were designed with the included angle of 45–70 degrees and the groove depth of 1.5–2 mm. The parts 76, 77 were welded using a filler JIS A5356WY of 1.2 mm in diameter by supplying an electric current of 170–230A with voltage of 19.5–25 V with a welding torch set with the advancing angle of 10 degrees and the targeting angle of 0 degree, while feeding Ar gas in a flow amount of 25 liters/minute as shielding gas to a welding zone.

Figure 49:
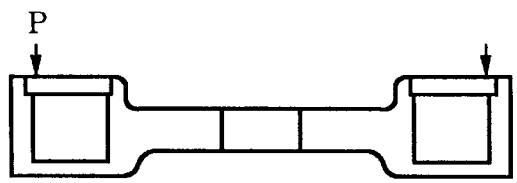
FIG. 49 is a sectional view showing the measuring points of a welded damper.
Figure 50:
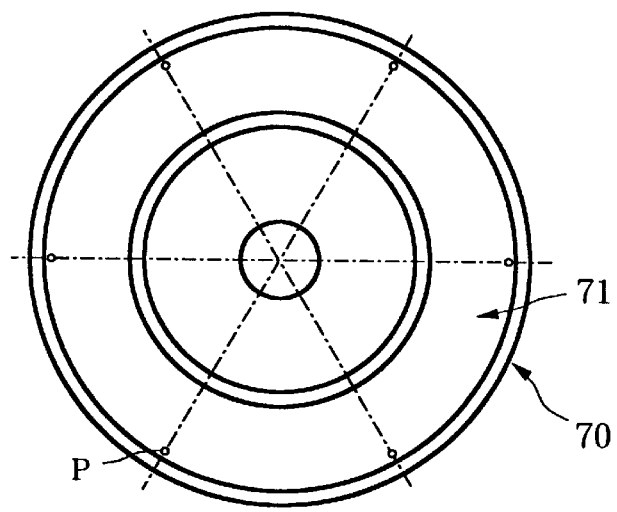
FIG. 50 is a plan view showing the same measuring points.
Figure 51:
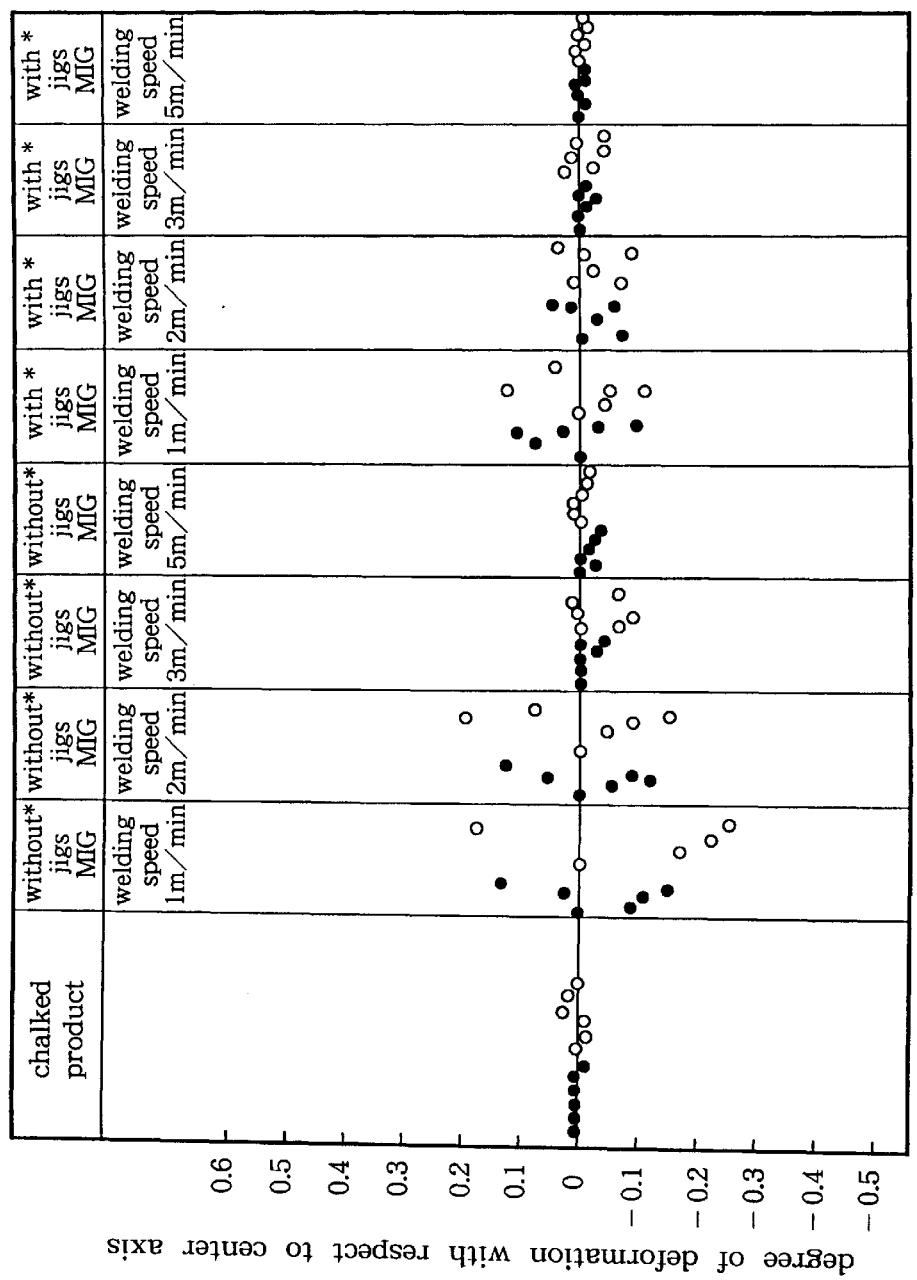
FIG. 51 is a graph for explaining the effects of a jig and a welding speed on the deformation of a welded product.

The receptacle 70 after being hermetically sealed with the cover 71 was separated from the jigs 73–75. The welded body was observed at 6 measuring points P (shown in FIGS. 49 and 50) in the same intervals along the circumferential direction to search the degree of deformation. FIG. 51 shows the measuring results of deformation classified in relation with the presence or absence of the jigs and the welding speed.

It is noted from FIG. 51 that the deformations of the welded products obtained by clamping the receptacle 70 and the cover 71 with the jigs 73–75 were remarkably smaller than those of the welded products obtained by welding without the jigs. In addition, when the welding was performed while clamping the receptacle 70 and the cover 71 with the jigs 73–75, the degree of deformation became smaller as the increase of the welding speed.

It is understood from these results that the jigs 73–75 effectively absorbed a heat during welding so as to make a good heat balance between the receptacle 70 and the cover 71 different in heat capacity. As a result, the thermal deformation of the receptacle 70 or the cover 71 was inhibited, and the receptacle 70 was prevented from sagging.

Figure 52:
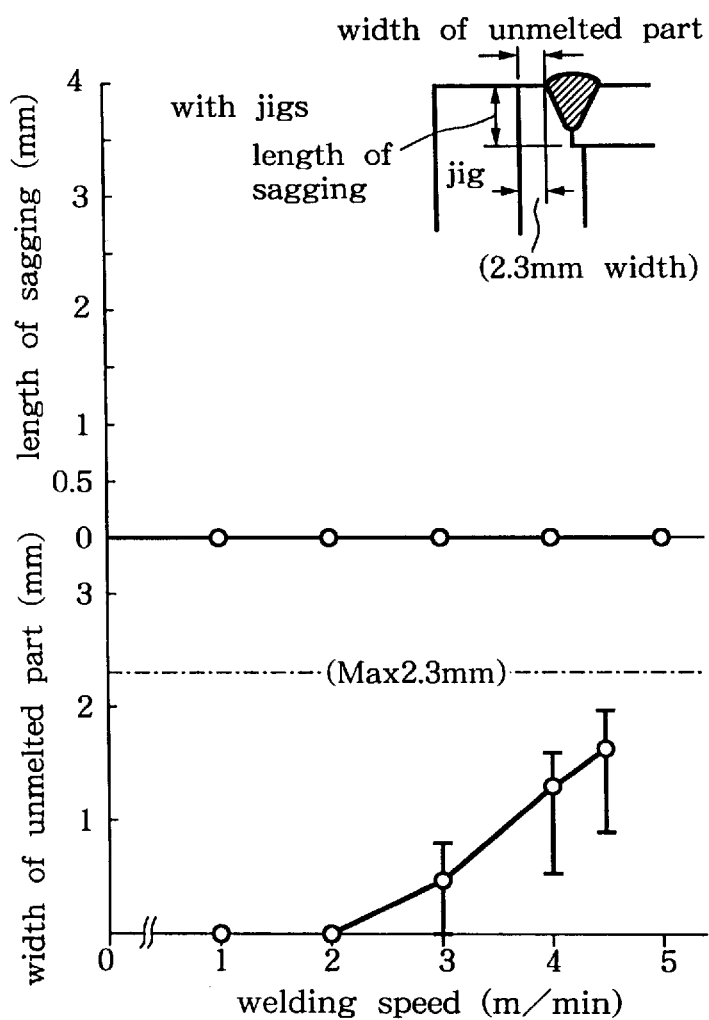
FIG. 52 is a graph for explaining the effects of a jig on the length of sagging and the width of unmelted parts.
Figure 53:
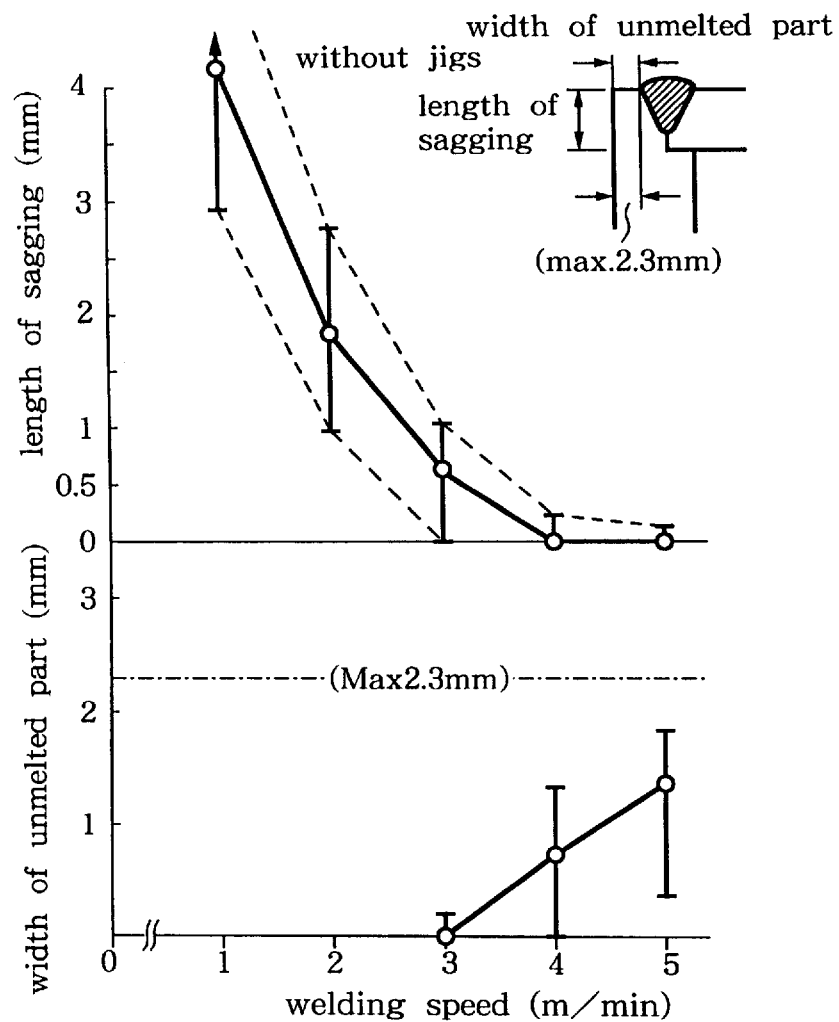
FIG. 53 is a graph for explaining the length of sagging and the width of unmelted parts formed at a welded damper without jigs.

The effects of the jigs 73–75 on inhibiting saggings and broadening the unmelted parts are recognized even at a slow welding speed of 2 m/minute or less, by comparing the results using the jigs shown in FIG. 52 with the results without the jigs shown in FIG. 53.

Accordingly, the conditions to weld the members with high dimensional accuracy are relaxed even in the high-speed MIG welding at a welding speed of 5 m/minute or higher, although the conditions shall be strictly controlled in a conventional welding method. As a result, it is easy to hermetically seal the receptacle by welding. The degree of deformation was small, even when there was a gap of 0.3 mm between the receptacle 70 and the cover 71, so that a machining cost for finishing the welded product can be saved.

Figure 54:
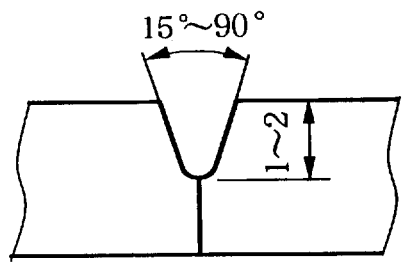
FIG. 54 is the sectional view of a bevel having flat groove faces.
Figure 55:
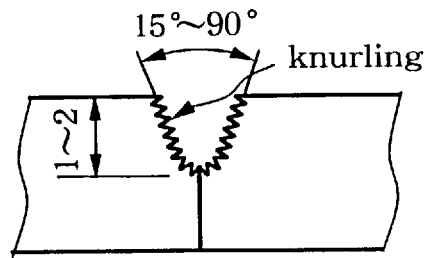
FIG. 55 is the sectional view of a bevel having jagged groove faces.
Figure 56:
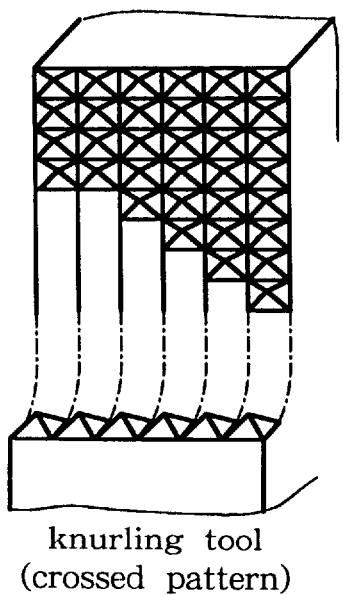
FIG. 56 is the bird's eye view of a knurling tool for jagging the groove faces of aluminum members.
Figure 57:
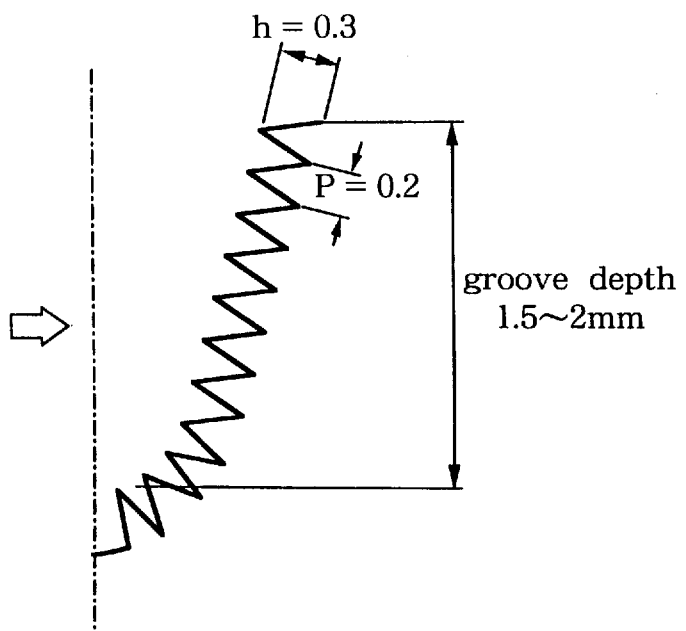
FIG. 57 is a view for explaining a joint geometry.

Example 2:

Members to be welded were made from an aluminum alloy JIS A6061-$T_6$. Bevels with various included angles and groove depths were formed on the groove faces of the aluminum members, as shown in FIGS. 54 and 55. FIG. 54 shows a normal bevel having a flat groove face without jaggedness, while FIG. 55 shows a bevel having jagged groove face. The groove face was worked using a knurling tool with a crossed pattern, as shown in FIG. 56, to form the jagged groove face having the dimensions shown in FIG. 57.

The aluminum members were MIG welded using a filler wire JIS A5356WY of 1.2 mm in diameter at a welding speed of 4 m/minute by supplying a welding current of 220A with a voltage of 23 V while feeding Ar gas in a flow amount of 25 liters/minute to a welding zone.

Figure 58:
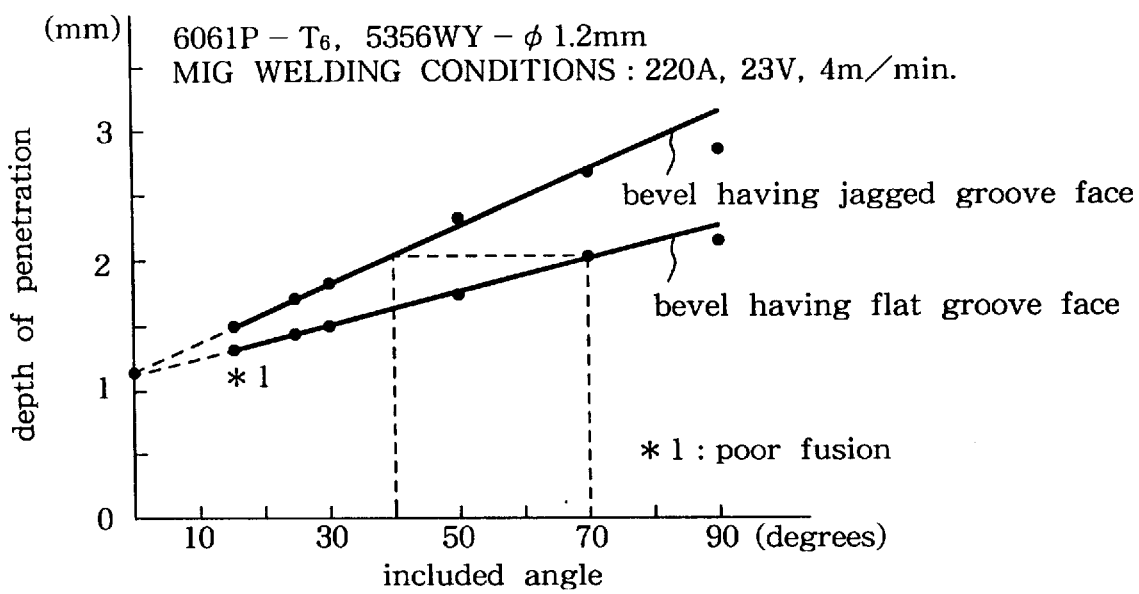
FIG. 58 is a graph for explaining the effect of included angles on the depth of penetration.
Figure 59:
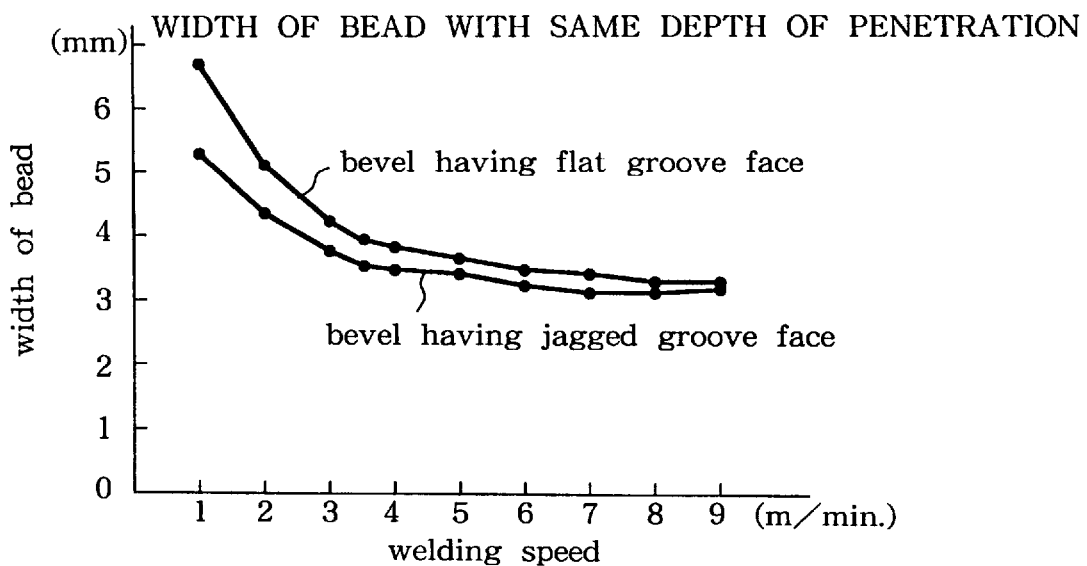
FIG. 59 is a graph for explaining the effect of a welding speed on the width of weld beads.
Figure 60:
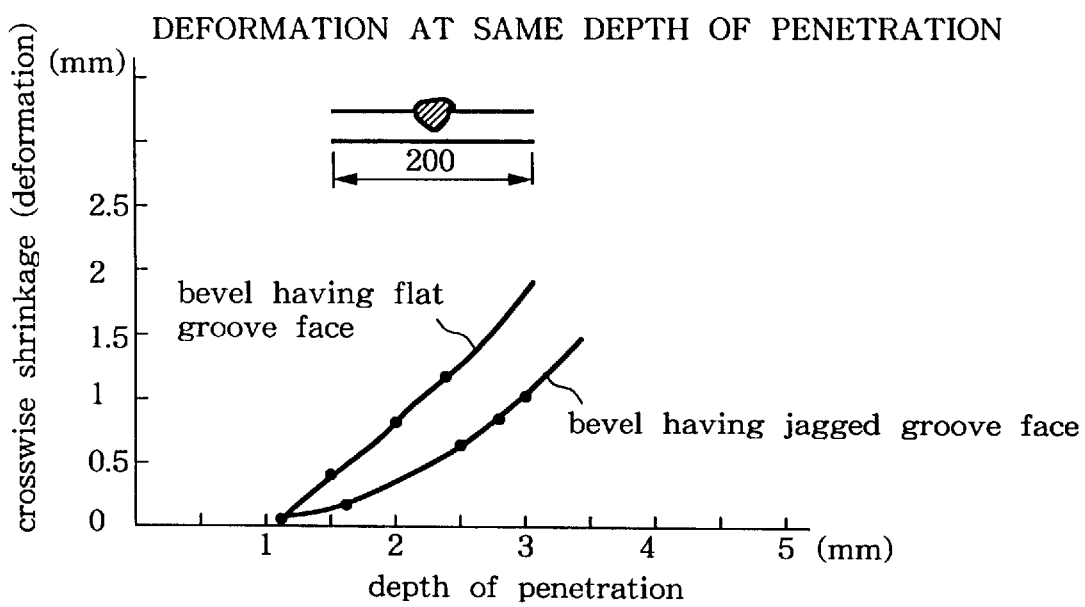
FIG. 60 is a graph for explaining the relationship between the depth of penetration and the crosswise shrinkage of welded members.
Figure 61:
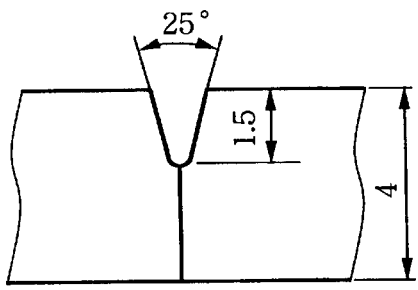
FIG. 61 is the sectional view of a bevel having flat groove faces.
Figure 62:
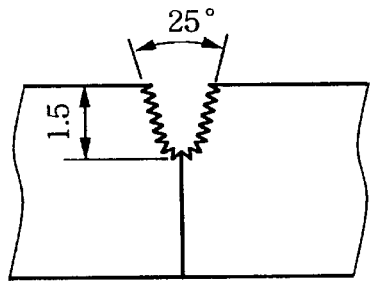
FIG. 62 is the sectional view of a bevel having jagged groove faces.
Figure 63:
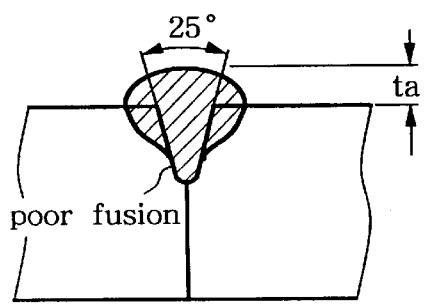
FIG. 63 is the sectional view of a weld bead with poor penetration formed at an ordinary bevel.
Figure 64:
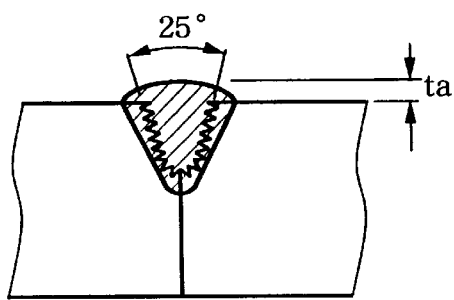
FIG. 64 is the sectional view of a weld bead with good penetration formed at a bevel having jagged groove faces.

The results of welding are shown in FIGS. 58 to 60.

The depth of penetration at the bevel having the jagged groove face was increased by approximately 30% at most compared with that at the bevel having the flat groove face, as shown in FIG. 58. The depth of penetration at the bevel having the jagged groove face with an included angle of 40 degrees was at the same level as that at the bevel having the flat groove face with an included angle of 70 degrees. The section of representative penetration at each bevel is shown in FIGS. 61 to 64.

Figure 65:
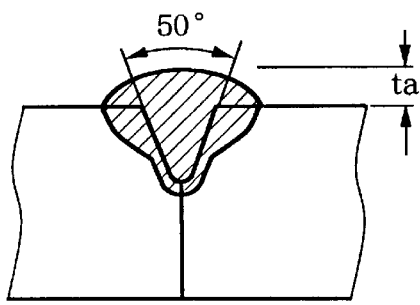
FIG. 65 is a sectional view for explaining a weld bead formed at the bevel having groove faces inclined with big included angles to facilitate penetration.

Bevels having flat groove faces (FIG. 61) and jagged groove faces (FIG. 62) with each included angle of 25 degrees and groove depth of 1.5 mm were formed at aluminum members to be welded. The aluminum members were welded under the same conditions as mentioned above. Poor fusion (FIG. 63) occurred at the bevel having the flat groove face, while the 1.8 mm depth of penetration (FIG. 64) was formed at the bevel having the jagged groove face. The included angle of 50 degrees (FIG. 65) was necessitated to obtain the same depth of penetration at the bevel having the flat groove face.

It is noted from these results that the jaggedness of the groove face exhibits the same effect as the larger included angle for obtaining sufficient penetration. The jagged groove face effectively reduces input energy, too. Since sufficent penetration was obtained even at a smaller included angle, the weld bead was made narrower as shown in FIG. 59. In addition, a quantity of input energy was reduced, so that deformation was substantially suppressed as shown in FIG. 60.

Figure 66:
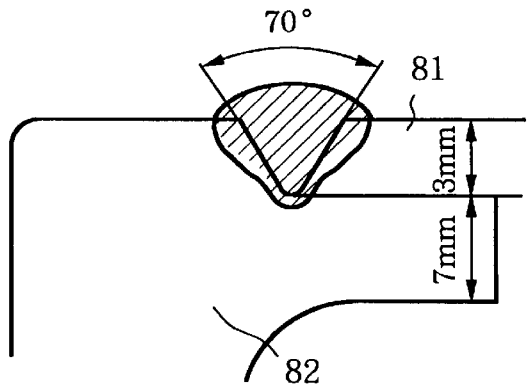
FIG. 66 is the sectional view of a wide weld bead formed at a bevel having flat groove faces between the yoke and the pipe of a drive shaft.

Example 3:

A pipe 81 made of an extruding aluminum alloy JIS A6082 was MIG welded to a yoke 82 made of a forging aluminum alloy JIS A 6061 as shown in FIGS. 66. An ordinary bevel having flat groove faces were formed on these aluminum members.

The aluminum members having the flat groove faces were welded using an aluminum alloy filler 5356WY of 1.6 mm in diameter at a welding speed 1 m/minute by supplying a welding current 240A with voltage of 24–25 V while feeding Ar gas in an amount of 30 liters/minute. An included angle of 70 degrees was necessary for sufficient penetration. The section of the welded joint was shown in FIG. 66. Since the heat capacity of the yoke 82 was bigger than that of the pipe 81, thermal energy necessary for melting the yoke 82 and the pipe 81 was not applied with a proper heat balance. Consequently, the welded part and the heat affected zone of the pipe 81 had poor strength, and defects were formed.

Figure 67:
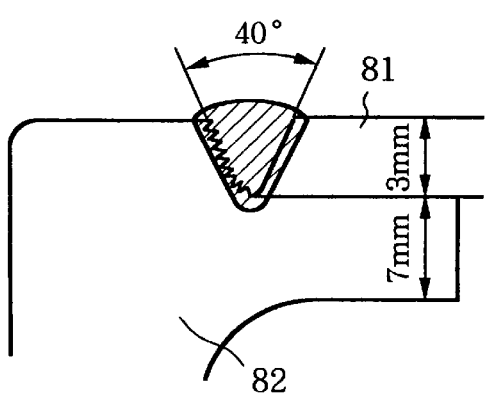
FIG. 67 is the sectional view of a narrow weld bead formed at a bevel having jagged groove faces.

When the end face of the yoke 82 having big heat capacity was jagged as shown in FIG. 67, a quantity of input energy was balanced between the yoke 82 and the pipe 81. These members were welded using an aluminum filler wire JIS A5356WY at a welding speed of 1 m/minute by supplying a welding current of 170A with voltage of 20 V while feeding Ar gas in a flow amount of 25 liters/minute.

Figure 68:
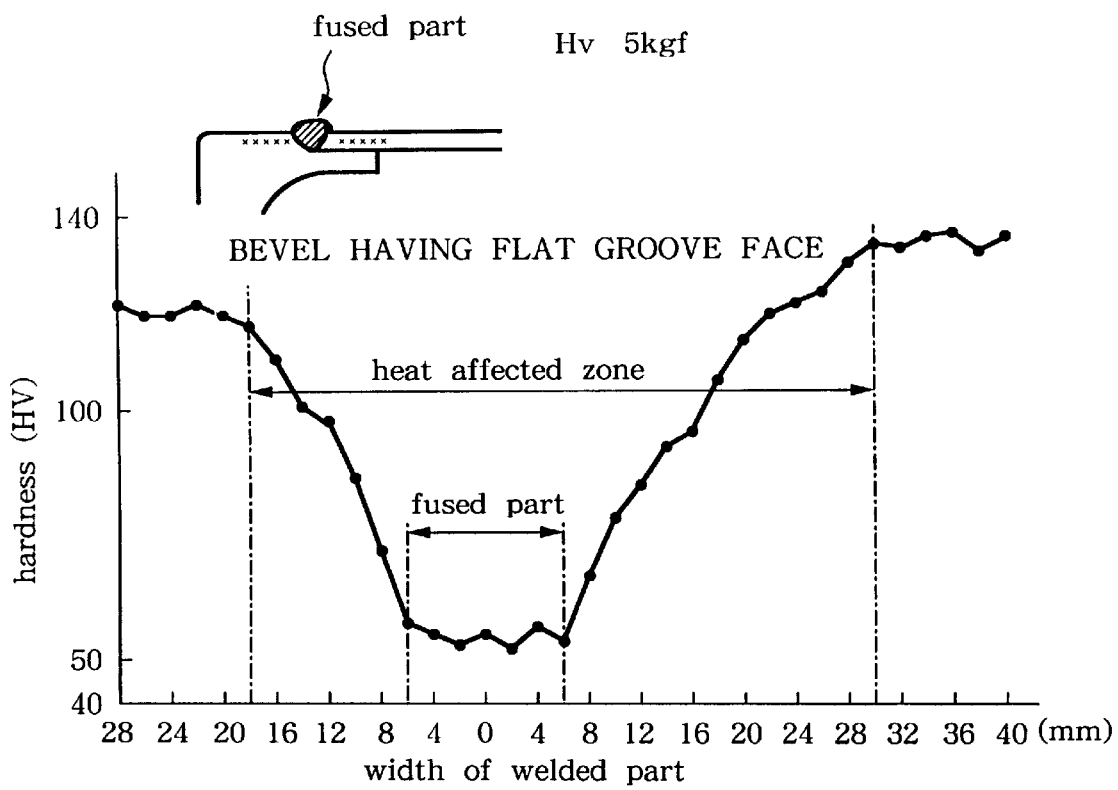
FIG. 68 is a graph for explaining the distribution of hardness along the width of a weld bead formed at a bevel having flat groove faces.
Figure 69:
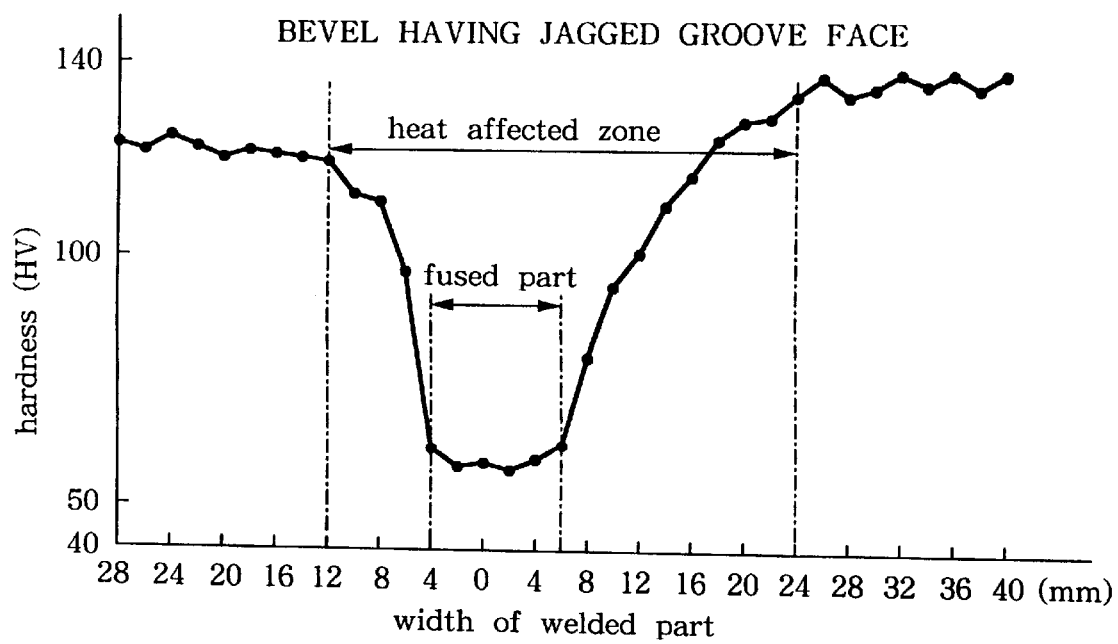
FIG. 69 is a graph for explaining the distribution of hardness along the width of a weld bead formed at a bevel having jagged groove faces.

The hardness of each welded part was detected along the width of welded beads. The distribution of the hardness is shown in FIGS. 68 and 69. A heat affected zone at the bevel having a flat groove face was of 48 mm in width as shown in FIG. 68, while a heat affected zone at the bevel having a jagged groove face was of 36 mm in width as shown in FIG. 69. That is, the heat affected zone was made narrower by jagging the groove face. The mechanical property of the welded part was improved by the bevel having the jagged groove face, too.

Figure 70:
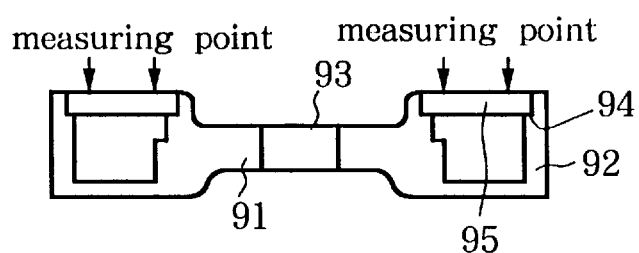
FIG. 70 is the sectional view of a welded viscous-type damper showing measuring points.
Figure 71:
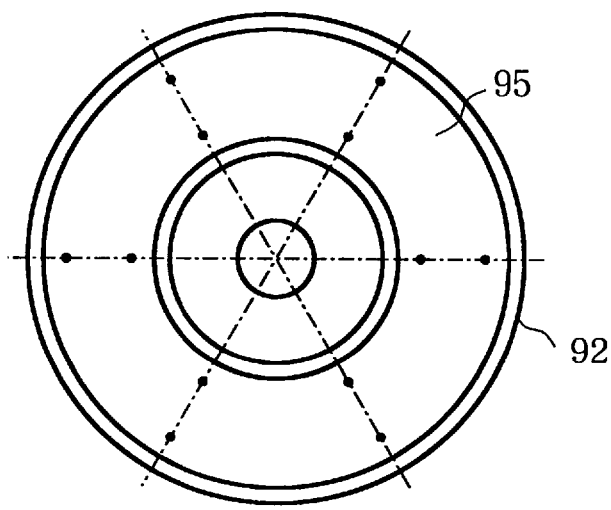
FIG. 71 is the plan view of the same damper.

Example 4:

The viscous-type damper shown in FIGS. 70 and 71 was manufactured by high-speed arc welding.

The outer member having a flat disc 91, an annular receptacle 92 and an opening 93 at the center of the flat disc 91 was unitarily made of a forging aluminum alloy JIS A6061. The annular receptacle 92 had a wall of 4.1 mm in thickness, and a step 94 of 4 mm in height and 3.5 mm in thickness was formed at the upper part of the wall. An annular cover 95 made of the same aluminum alloy JIS A6061 was used as the inner member.

One or both of the wall of the annular receptacle 92 and the annular cover 95 were beveled with an angle of 50 degrees and a depth of 1.8 mm. The root of the bevel was round-cornered with a radius R of 0.6 mm. The annular cover 95 was received in the annular receptacle 92 and located on the step 94.

The groove face of the annular cover 95 was MIG welded to the annular receptacle 92 using a filler wire JIS A5356WY of 1.2 in diameter by supplying a rectangular pulsed current while feeding Ar as inert gas in a flow amount of 24 liters/minute. The pulsed current had an effective current $I_M$ of 210A, a peak current $I_P$ of 250A and a base current $1_B$ of 60A. A period for supplying the peak current $I_P$ was set to 1.2 milliseconds. A welding voltage was held at a constant level of 23 V. A welding torch was directed to the bevel with an advancing angle of 10 degrees and a targeting angle of 0 degree.

A welding speed was variously changed under the welding conditions above-mentioned. The depth of penetration, the degree of deformation, the height of excess metal and a temperature just after welding were detected at each measuring point (apart 5 mm from the center of the weld line) shown by the arrows in FIG. 70 and as the solid circle in FIG. 71.

Figure 72:
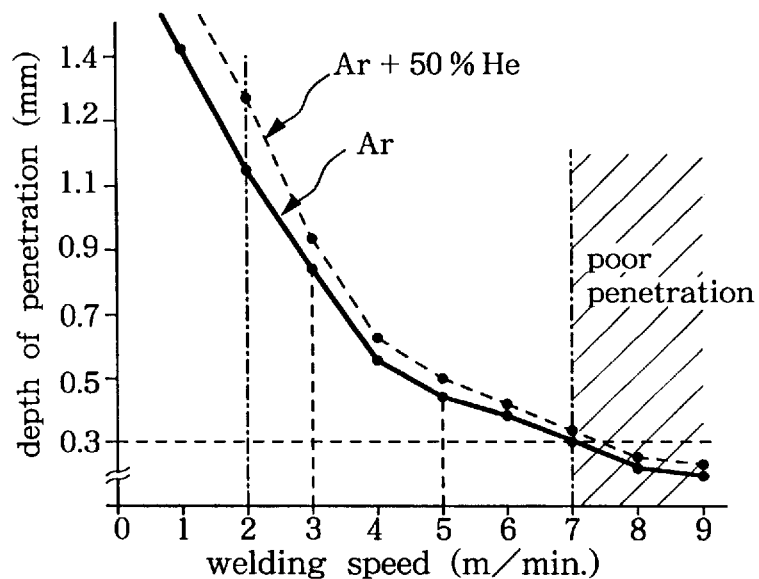
FIG. 72 is a graph for explaining the effect of a welding speed on the depth of penetration.
Figure 73:
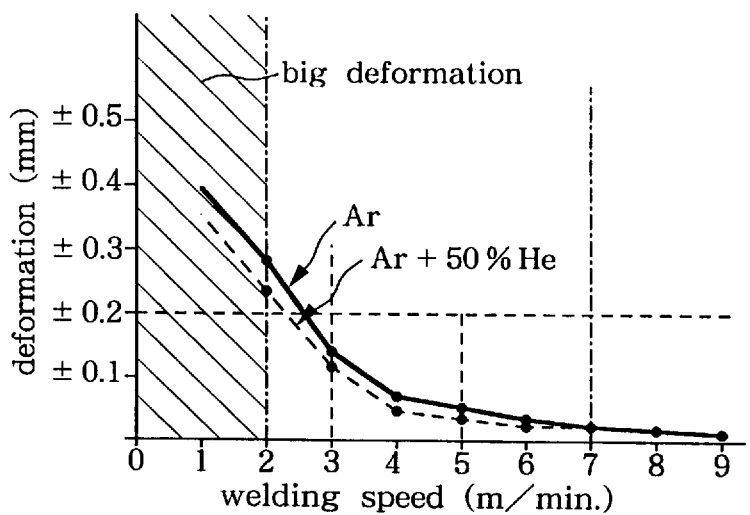
FIG. 73 is a graph for explaining the effect of a welding speed on the degree of deformation.

The detected values were averaged and arranged in relation with the welding speed. The result is shown as the solid line in each of FIGS. 72 to 75. The depth of penetration became smaller as the increase of the welding speed, as shown in FIG. 72. When the welding speed exceeded 7 m/minute, the depth of penetration from the bottom of the groove was less than 0.3 mm. The degree of deformation became bigger as the lowering of the welding speed, as shown in FIG. 73.

Figure 74:
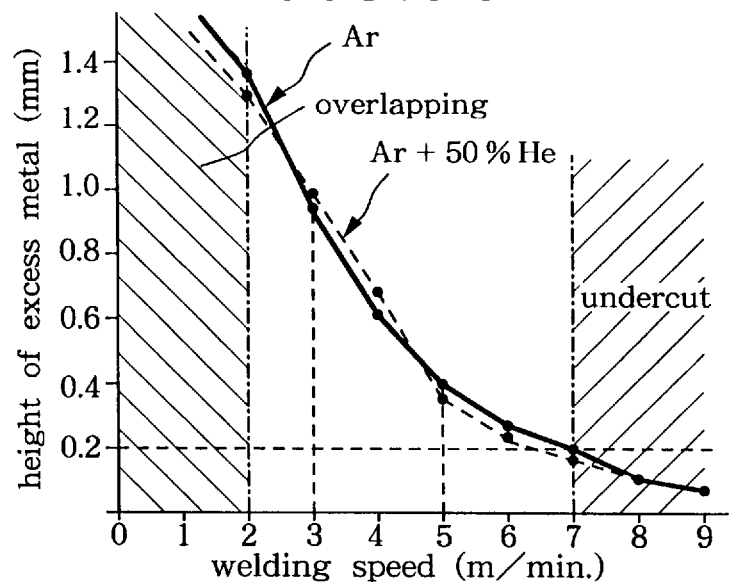
FIG. 74 is a graph for explaining the effect of a welding speed on the height of excess metal.
Figure 75:
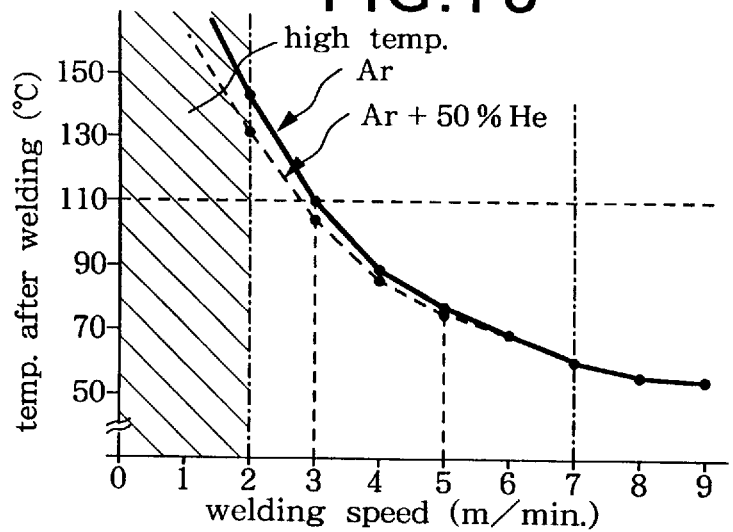
FIG. 75 is a graph for explaining the effect of a welding speed on the temperature of a welded part just after welding.

When the welding speed was below 2 m/minute, the degree of deformation was ±0.3 or more. The excess metal was excessively overlapped at the welding speed below 2 m/minute, as shown in FIG. 74. Defects which caused undercut was formed at the welding speed above 7 m.minute. On the contrary, when the welding speed was kept within the range of 2–7 m/minute, good weld beads were formed with the proper height of excess metal.

The temperature (shown in FIG. 75) just after welding rose above 140° C. at which inner members such as fluororesin bearings would be damaged, when the welding speed was slower than 2 m/minute. However, the temperature fell to a sufficiently lower level as the increase of the welding speed.

It is noted from these results that the annular cover 95 was welded to the annular receptacle 92 with good weld beads under the welding conditions according to the present invention. The viscous -type damper obtained in this way had the hermetically sealed joint between the annular cover 95 and the annular receptacle 92. The welded joint had high strength, too. Accordingly, the viscous-type damper was used as a product excellent in durability.

The same annular cover 95 was welded to the same annular receptacle 92 under the same welding conditions but feeding the mixture of Ar with 50 vol.% He as inert gas to the welding zone. The result in this case is shown as the broken line in each of FIGS. 72 to 75. It is noted from these results that the mixing of He in the inert gas is effective for making narrow weld beads with deep penetration. It is also recognized that weld beads became narrower with deeper penetration by using sole He as the inert gas.

Figure 76:
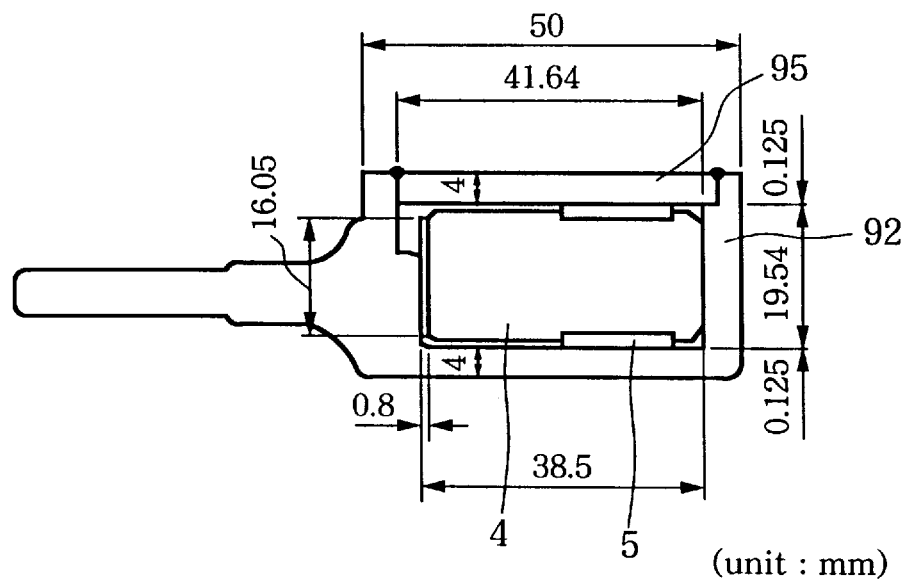
FIG. 76 is a sectional view for explaining the shape and dimensions of a viscous-type damper in Example 5.

Example 5:

Viscous-type dampers having the shape and dimensions shown in FIG. 76 were produced by MIG welding according to the present invention and $CO_2$ gas laser welding. The MIG welding was performed under the same conditions as those in Example 4. In the $CO_2$ gas laser welding, a parabolic head of 10 inches was used, and a cover 95 was welded to a receptacle 92 with output of 4 kW while feeding Ar gas in a flow amount of 25 liters/minute.

The deformation of each obtained viscous-type damper was measured with respect to its axis. The measured values were classified according to the welding method and the welding speed. The results are shown in FIG. 77, compared with a viscous-type damper obtained by calking the cover 95 to the receptacle 92.

It is noted from FIG. 77 that the degree of deformation was bigger at the welding speed of 1 m/minute in the MIG welding. As the increase of the welding speed, the degree of deformation was reduced to a level similar to that of the damper obtained by calking. The degree of deformation was smallest at the welding speed of 9 m/minute. However, the depth of penetration did not reach 0.3 mm or more at the welding speed of 9 m/minute.

On the other hand, the degree of deformation was not reduced so much even by the increase of the welding speed in the $CO_2$ gas laser welding. During the $CO_2$ gas laser welding, it was impossible to enhance the welding speed higher than 2 m/minute in order to feed a filler wire under stable condition.

According to the present invention as afore-mentioned, when aluminum members quite different in heat capacity from each other are welded, the jig which covers the member at a part near the joint to be welded and has the function to adjust heat capacity is provided so as to inhibit saggings and burning-through during welding. The jig effectively inhibits the deformation and materialistic deterioration of the welded members caused by excessive input energy, too. Since an arc is prevented from turning around by the jig, the surface of the welded aluminum member is kept in its initial good external appearance free from defects such as weld spots. In addition, strains or deformations are suppressed by the inhibition of excessive heating, so that the welded product is improved in dimensional accuracy. Consequently, the welded product good of dimensional accuracy and external appearance can be obtained, even by welding aluminum members fairly different in a heat capacity from each other.

The welding speed can be enhanced up to 2–7 m/minute by providing a bevel having a jagged groove face or faces. The high speed welding effectively reduces energy to be inputted to the aluminum member to be welded and facilitates the formation of narrow weld beads with sufficient penetration. The reduced input energy suppresses the deformation of the welded aluminum member, and the good weld beads improve the external appearance of the welded body. Accordingly, an aluminum product having excellent welded joint can be obtained by widely used TIG or MIG welding.

The high speed welding effectively prevents the welded members from deforming due to the reduction of input energy, and the good weld beads improve the external appearance and hermetic seal of the welded product.

Consequently, a product having an inner member such as a cover hermetically sealed to an outer member such as a receptacle body is obtained. The product is useful as a viscous-type damper suitable for vibration absorption, for instance.

What is claimed is:

1. An arc welding method for welding aluminum members different in heat capacity from each other comprising the steps of:
   providing a jig having a big heat capacity and a configuration corresponding to a part of a profile of an aluminum member having a smaller heat capacity,
   holding said jig in contact with said aluminum member having said smaller heat capacity, so as to stabilize a heat balance between said aluminum member having said smaller heat capacity and another aluminum member having a bigger heat capacity, and
   arc welding said aluminum members together.

2. The arc welding method according to claim 1, wherein said jig is made of material good of thermal conductivity.

3. The arc welding method according to claim 1, wherein said jig includes a cooling means incorporated therein.

4. The arc welding method according to claim 1, wherein the jig is held in contact with a surface part of said aluminum member having said smaller heat capacity in order to prevent melting of said surface.

5. A welding method of arc welding aluminum members, comprising:
   holding a jig in close contact with surface parts of aluminum members in order to prevent melting of said aluminum members, said jig having a width $W_j$ defined by a formula of $W_j > W_a - W_b$, wherein $W_a$ is defined as the width of an arc projected upon said surface parts of said aluminum members to be welded, when the width $W_a$ is larger than a thickness $W_b$ of said aluminum members at a face to be welded, and
   arc welding said aluminum members while inhibiting a turning-around of said arc onto said surface parts with use of said jig, thereby preventing melting of said surface parts.

6. An arc welding method for hermetically sealing an aluminum receptacle with an aluminum cover comprising the steps of:
   providing a jig having a big heat capacity and a configuration corresponding to a side face of said receptable subject to a condition of $t_1 \leq 100/t$, wherein $t_1$ (mm) is a height of said jig from the upper surface of said receptacle, and t (mm) is a thickness of said receptacle at a joint to be welded,
   holding said jig in contact with said side face of said receptacle, and
   arc welding said cover to said receptable.

7. The arc welding method according to claim 6, wherein said jig includes an inner flange to be held in contact with an upper surface part of the receptacle subject to a condition of $t_2 < t$, wherein $t_2$ is a width of said inner flange, and t is a thickness of the receptacle at a joint to be welded.

8. The arc welding method according to claim 6, wherein said jig includes an inner flange located above an upper surface of the receptacle subject to a condition of $t_3 \leq t_2$, wherein $t_3$ is a distance from the upper surface of said receptacle to a lower surface of said inner flange, and $t_2$ is a width of said inner flange.

9. An arc welding method for hermetically sealing a cylindrical aluminum receptacle with a disc-shaped aluminum cover comprising the steps of:
   providing a jig having an inner face or rollers which moves along an outside face of said receptacle,
   carrying said jig along the outside face of said receptacle in a state that a surface selected from one of said inner face or rollers is pressed onto the outside face of said receptacle, and
   arc welding said cover to said receptable.

10. An arc welding method for hermetically sealing an outer aluminum member with an inner aluminum member, comprising the steps of:
    facing a side face of said inner member to an inner surface of said outer member providing that a top face of said outer member is held at a position higher than an upper surface of said inner member subject to a condition of $1/t_a \leq t_b \leq 50/t_a$, wherein $t_a$ (mm) is a thickness of said outer member at a joint to be welded, and $t_b$ (mm) is a difference of height between said top face of said outer member and said upper surface of said inner member, and
    MIG welding a facing part at a welding speed of 2–7 m/minute.

11. The arc welding method according to claim 10, wherein said outer member has an outer flange on a side face at an upper part.

12. A viscous-type damper comprising a flat disc having an opening at the center, an annular receptacle formed at a periphery of said disc, and a cover welded to said receptacle, wherein said receptacle is hermetically sealed with said cover by providing a jig having a big heat capacity and a configuration corresponding to a profile of said damper, holding said jig in contact with said damper, so as to stabilize a heat balance between said disc, receptacle and cover, and arc welding said cover to said receptacle.

13. A viscous-type damper according to claim 12, wherein said receptacle is hermetically sealed with said cover by providing a jig having an inner face or rollers which moves along an outside face of said receptacle, carrying said jig along the outside face of said receptacle in a state that said inner face or said rollers are pressed onto the outside face of said receptacle, and arc welding said cover to said receptacle.

14. A viscous-type damper according to claim 12, wherein said receptacle is hermetically sealed with said cover by forming a bevel between said cover and said receptacle having groove faces at least one of which is jagged.

15. A viscous-type damper according to claim 12, wherein said receptacle is hermetically sealed with said cover by facing a side face of said cover to an inner surface of said receptacle, and MIG welding said cover to said receptacle at a welding speed of 2–7 m/minute.

16. A viscous-type damper according to claim 12, wherein said receptacle is hermetically sealed with said cover by forming a bevel between said cover and said receptacle, and MIG welding said cover to said receptacle at a welding speed of 2–7 m/minute.

* * * * *

UNITED STATES PATENT AND TRADEMARK OFFICE
CERTIFICATE OF CORRECTION

PATENT NO. : 5,811,756
DATED : September 22, 1998
INVENTOR(S) : Motoshi Horita et al.

It is certified that error appears in the above-identified patent and that said Letters Patent is hereby corrected as shown below:

Column 7 Line 33 after "Example 5": delete period and insert --; and--.

Column 12 Lines 10-11 between "such" and "fused" delete --the--.

Column 13 Line 29 "wherein ta represents" should read --wherein $t_a$ represents--.

Column 15 Line 19 "damper 78" should read --clamper 78--.

Column 17 Line 44 "base current $1_B$" should read --base current $I_B$--.

Signed and Sealed this

Twenty-third Day of February, 1999

Attest:

Q. TODD DICKINSON

*Attesting Officer*  *Acting Commissioner of Patents and Trademarks*